(12) United States Patent
Rees et al.

(10) Patent No.: US 11,601,605 B2
(45) Date of Patent: Mar. 7, 2023

(54) THERMAL IMAGING CAMERA DEVICE

(71) Applicant: Thermal Imaging Radar, LLC, Orem, UT (US)

(72) Inventors: Dana Rees, Orem, UT (US); David T. Kay, South Jordan, UT (US)

(73) Assignee: THERMAL IMAGING RADAR, LLC

( * ) Notice: Subject to any disclaimer, the term of this patent is extended or adjusted under 35 U.S.C. 154(b) by 0 days.

(21) Appl. No.: 16/951,989

(22) Filed: Nov. 18, 2020

(65) Prior Publication Data

US 2021/0258515 A1 Aug. 19, 2021

Related U.S. Application Data

(60) Provisional application No. 62/939,463, filed on Nov. 22, 2019.

(51) Int. Cl.
*H04N 5/33* (2006.01)
*G01J 5/02* (2022.01)
(Continued)

(52) U.S. Cl.
CPC .................. *H04N 5/33* (2013.01); *G01J 5/02* (2013.01); *G03B 17/02* (2013.01); *G03B 37/02* (2013.01); *G08B 13/19619* (2013.01); *H04N 23/50* (2023.01); *H04N 23/695* (2023.01); *G01J 2005/0077* (2013.01)

(58) Field of Classification Search
None
See application file for complete search history.

(56) References Cited

U.S. PATENT DOCUMENTS 3,336,810 A 8/1967 Schaffer et al.
3,648,384 A 3/1972 Roberts
(Continued)

FOREIGN PATENT DOCUMENTS

CN 1254856 A 5/2000
CN 1485690 A 3/2004
(Continued)

OTHER PUBLICATIONS

Notice of Allowance and Fees Due (PTOL-85) dated Apr. 28, 2021 for U.S. Appl. No. 16/746,550.
(Continued)

*Primary Examiner* — Stefan Gadomski
(74) *Attorney, Agent, or Firm* — Workman Nydegger

(57) ABSTRACT

An improved camera system includes an uncooled thermal imaging sensor, a rotary actuator, a rotary encoder, and a slip ring. The rotary actuator is physically coupled to the uncooled thermal imaging sensor and enables the sensor to rotate a full 360 degrees any number of times relative to the system's horizontal base. Through the use of the slip ring, the sensor and the sensor's wiring can rotate freely without impedance. Notably, the sensor's wiring can be disposed through a central through-hole running the length of the rotary actuator. Therefore, prior to reaching the slip ring, the sensor and its wiring rotate in unison with the rotary actuator. The encoder is structured to monitor the angular position of the sensor in order to accurately determine where the sensor is being aimed.

11 Claims, 25 Drawing Sheets

(51) Int. Cl.
  *G03B 37/02*    (2021.01)
  *H04N 5/225*    (2006.01)
  *H04N 5/232*    (2006.01)
  *G08B 13/196*   (2006.01)
  *G03B 17/02*    (2021.01)
  *G01J 5/00*     (2022.01)
  *H04N 23/50*    (2023.01)
  *H04N 23/695*   (2023.01)

(56) References Cited

U.S. PATENT DOCUMENTS

| | | | |
|---|---|---|---|
| 3,769,501 A | 10/1973 | Mc Donough | |
| 3,883,788 A | 5/1975 | Storey, Jr. | |
| 4,155,100 A * | 5/1979 | Hill, Jr. | G03B 15/08 348/211.3 |
| 4,263,513 A | 4/1981 | Palluet | |
| 4,465,959 A | 8/1984 | Yajima | |
| 4,602,857 A | 7/1986 | Woltz et al. | |
| 4,710,691 A | 12/1987 | Bergstrom et al. | |
| 4,833,534 A * | 5/1989 | Paff | H04N 7/183 348/E7.087 |
| 4,922,275 A | 5/1990 | Hughes | |
| 4,977,323 A * | 12/1990 | Jehle | H04N 5/33 348/E3.01 |
| 4,982,218 A | 1/1991 | Tsuboi et al. | |
| 4,988,938 A | 1/1991 | Ito et al. | |
| 5,159,368 A * | 10/1992 | Zemlin | G03B 37/02 248/349.1 |
| 5,453,618 A | 9/1995 | Sutton et al. | |
| 5,598,207 A * | 1/1997 | Kormos | F16M 11/18 348/148 |
| 5,650,813 A | 7/1997 | Gilblom et al. | |
| D381,997 S | 8/1997 | Morooka | |
| 5,729,016 A * | 3/1998 | Klapper | G02B 23/12 348/148 |
| 5,752,113 A | 5/1998 | Borden | |
| 5,790,183 A | 8/1998 | Kerbyson | |
| 5,807,950 A | 9/1998 | Correia et al. | |
| 5,990,941 A | 11/1999 | Jackson et al. | |
| 6,023,588 A | 2/2000 | Ray et al. | |
| 6,030,103 A * | 2/2000 | Gampe | F21V 23/00 362/406 |
| 6,034,716 A * | 3/2000 | Whiting | H04N 5/2259 348/36 |
| 6,071,740 A | 6/2000 | Kerouac | |
| 6,088,534 A | 7/2000 | Tominaga et al. | |
| 6,133,943 A | 10/2000 | Needham | |
| D435,577 S | 12/2000 | McBride | |
| 6,195,204 B1 | 2/2001 | Nalwa | |
| 6,215,115 B1 | 4/2001 | Baker et al. | |
| 6,268,882 B1 * | 7/2001 | Elberbaum | G08B 13/1963 348/E7.087 |
| 6,304,284 B1 | 10/2001 | Dunton et al. | |
| 6,304,285 B1 | 10/2001 | Geng | |
| 6,388,414 B1 | 5/2002 | Kobayashi | |
| 6,539,162 B1 | 3/2003 | Stephenson | |
| 6,628,338 B1 * | 9/2003 | Elberbaum | G08B 13/19636 348/373 |
| D482,712 S | 11/2003 | Hsu | |
| 6,677,982 B1 | 1/2004 | Chen et al. | |
| 6,678,001 B1 | 1/2004 | Elberbaum | |
| D486,847 S * | 2/2004 | Uehara | D16/202 |
| 6,731,799 B1 | 5/2004 | Sun et al. | |
| 6,738,073 B2 | 5/2004 | Park et al. | |
| 6,738,569 B1 | 5/2004 | Sogabe et al. | |
| 6,809,887 B1 | 10/2004 | Gao et al. | |
| 6,948,402 B1 | 9/2005 | Amendolea | |
| 6,991,384 B1 | 1/2006 | Davis | |
| 6,992,722 B2 | 1/2006 | Jung | |
| D520,548 S | 5/2006 | Tsai | |
| 7,088,907 B1 | 8/2006 | Nishijima et al. | |
| 7,126,630 B1 | 10/2006 | Lee et al. | |
| D543,644 S | 5/2007 | Bembridge | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 | 10/2008 | Sim et al. | |
| 7,525,567 B2 | 4/2009 | McCutchen | |
| 7,561,187 B2 | 7/2009 | Umezaki et al. | |
| 7,732,771 B2 | 6/2010 | Hasegawa et al. | |
| D640,721 S | 6/2011 | Satine | |
| 7,991,575 B2 * | 8/2011 | Vogel | G01B 11/26 359/850 |
| 8,106,936 B2 | 1/2012 | Strzempko et al. | |
| 8,184,168 B2 | 5/2012 | Kindborg et al. | |
| 8,194,912 B2 | 6/2012 | Kitaura et al. | |
| 8,285,512 B2 | 10/2012 | Vogel et al. | |
| D673,988 S | 1/2013 | Riegl et al. | |
| 8,355,042 B2 | 1/2013 | Lablans | |
| 8,594,483 B2 | 11/2013 | Koyanagi et al. | |
| D695,809 S * | 12/2013 | Katori | D16/203 |
| 8,773,503 B2 | 7/2014 | Dortch et al. | |
| D728,655 S * | 5/2015 | Daniel | D16/203 |
| 9,071,740 B1 * | 6/2015 | Duffy | G08B 13/19658 |
| D741,388 S | 10/2015 | Register et al. | |
| D743,468 S | 11/2015 | Ribeiro et al. | |
| D749,329 S | 2/2016 | Kaiser | |
| 9,348,196 B1 | 5/2016 | Dortch | |
| 9,363,569 B1 | 6/2016 | Van et al. | |
| 9,390,604 B2 | 7/2016 | Dortch et al. | |
| 9,516,208 B2 | 12/2016 | Dortch et al. | |
| D776,181 S | 1/2017 | Dortch et al. | |
| 9,685,896 B2 | 6/2017 | Dortch et al. | |
| 9,742,996 B1 | 8/2017 | Martin et al. | |
| D798,935 S | 10/2017 | Dimitriadis et al. | |
| D809,043 S | 1/2018 | Kamei | |
| 9,886,776 B2 | 2/2018 | Dortch et al. | |
| D813,291 S | 3/2018 | Wu et al. | |
| D813,923 S | 3/2018 | Wieser et al. | |
| D819,112 S | 5/2018 | Kim et al. | |
| 10,127,686 B2 | 11/2018 | Dortch | |
| 10,270,959 B1 * | 4/2019 | Bart | H04N 7/183 |
| D849,095 S | 5/2019 | Puric et al. | |
| 10,366,509 B2 | 7/2019 | Jones et al. | |
| 10,574,886 B2 | 2/2020 | Jones et al. | |
| 2001/0026684 A1 | 10/2001 | Sorek et al. | |
| 2001/0027456 A1 | 10/2001 | Lancaster et al. | |
| 2001/0043264 A1 | 11/2001 | Sinclair et al. | |
| 2001/0052735 A1 * | 12/2001 | Sakamoto | F16M 13/027 310/83 |
| 2002/0025023 A1 * | 2/2002 | Herold | A61B 6/56 378/146 |
| 2002/0131781 A1 * | 9/2002 | Buck | H04N 5/2251 348/E5.025 |
| 2002/0145346 A1 * | 10/2002 | Ito | H02K 7/10 310/99 |
| 2002/0184017 A1 | 12/2002 | Lee et al. | |
| 2002/0185926 A1 | 12/2002 | King et al. | |
| 2003/0025599 A1 | 2/2003 | Monroe | |
| 2003/0071891 A1 | 4/2003 | Geng | |
| 2003/0160863 A1 | 8/2003 | Kakou et al. | |
| 2003/0174056 A1 | 9/2003 | Harshaw | |
| 2003/0197785 A1 | 10/2003 | White et al. | |
| 2004/0017470 A1 | 1/2004 | Hama et al. | |
| 2004/0075741 A1 | 4/2004 | Berkey et al. | |
| 2004/0155558 A1 | 8/2004 | Cutting et al. | |
| 2004/0179098 A1 | 9/2004 | Haehn et al. | |
| 2004/0183941 A1 | 9/2004 | McCutchen | |
| 2004/0233274 A1 | 11/2004 | Uyttendaele et al. | |
| 2004/0257026 A1 | 12/2004 | Rogers et al. | |
| 2005/0041100 A1 | 2/2005 | Maguire, Jr. | |
| 2005/0152447 A1 | 7/2005 | Jouppi et al. | |
| 2005/0207487 A1 | 9/2005 | Monroe | |
| 2005/0261820 A1 | 11/2005 | Feeney et al. | |
| 2005/0285953 A1 | 12/2005 | Hasegawa et al. | |
| 2006/0056056 A1 | 3/2006 | Ahiska et al. | |
| 2006/0072020 A1 * | 4/2006 | McCutchen | H04N 13/243 348/E5.025 |
| 2006/0179463 A1 | 8/2006 | Chisholm et al. | |
| 2006/0268112 A1 | 11/2006 | Ikeda | |
| 2007/0025723 A1 | 2/2007 | Baudisch et al. | |

(56) References Cited

U.S. PATENT DOCUMENTS

| | | |
|---|---|---|
| 2007/0041726 A1* | 2/2007 | Lee .................... G08B 13/1963 396/427 |
| 2007/0061735 A1 | 3/2007 | Hoffberg et al. |
| 2007/0115527 A1 | 5/2007 | Lee |
| 2008/0106593 A1 | 5/2008 | Arfvidsson et al. |
| 2008/0159732 A1 | 7/2008 | Young et al. |
| 2008/0267477 A1 | 10/2008 | Conti et al. |
| 2009/0025244 A1* | 1/2009 | Jonas .................... G01B 21/045 374/E1.001 |
| 2009/0051310 A1 | 2/2009 | Chandhoke |
| 2009/0052884 A1* | 2/2009 | Lee .................... F16M 11/18 248/638 |
| 2009/0066796 A1 | 3/2009 | Karasyuk et al. |
| 2009/0085509 A1* | 4/2009 | Chang .................... H02P 8/12 318/696 |
| 2009/0087096 A1 | 4/2009 | Eaton et al. |
| 2009/0167858 A1 | 7/2009 | McCormack |
| 2009/0309966 A1 | 12/2009 | Chen et al. |
| 2010/0020310 A1 | 1/2010 | Merklein |
| 2010/0026809 A1 | 2/2010 | Curry |
| 2010/0091089 A1 | 4/2010 | Cromwell et al. |
| 2010/0097444 A1 | 4/2010 | Lablans |
| 2010/0128122 A1* | 5/2010 | Wright .................... G08B 13/19636 348/E5.022 |
| 2010/0142757 A1 | 6/2010 | Sandstroem et al. |
| 2010/0208032 A1 | 8/2010 | Kweon |
| 2010/0303289 A1 | 12/2010 | Polzin et al. |
| 2011/0055696 A1 | 3/2011 | Dollar et al. |
| 2011/0058036 A1 | 3/2011 | Metzger et al. |
| 2011/0174762 A1 | 7/2011 | Tsai |
| 2011/0220797 A1* | 9/2011 | Hoelter .................... G01J 5/0875 264/2.7 |
| 2011/0293180 A1 | 12/2011 | Crimin et al. |
| 2011/0293247 A1 | 12/2011 | Bhagavathy et al. |
| 2011/0316970 A1 | 12/2011 | Cheong |
| 2012/0051588 A1 | 3/2012 | Mceldowney |
| 2012/0127169 A1 | 5/2012 | Barcay et al. |
| 2012/0127284 A1 | 5/2012 | Bar-Zeev et al. |
| 2012/0133639 A1 | 5/2012 | Kopf et al. |
| 2012/0155744 A1 | 6/2012 | Kennedy et al. |
| 2012/0176401 A1 | 7/2012 | Hayward et al. |
| 2012/0194564 A1 | 8/2012 | White et al. |
| 2012/0206565 A1 | 8/2012 | Villmer |
| 2012/0249866 A1* | 10/2012 | Alm .................... H04N 5/2251 348/E5.025 |
| 2012/0293334 A1 | 11/2012 | Yu et al. |
| 2012/0299920 A1 | 11/2012 | Coombe et al. |
| 2012/0300019 A1 | 11/2012 | Yang et al. |
| 2012/0314066 A1 | 12/2012 | Lee et al. |
| 2012/0320148 A1* | 12/2012 | Unger .................... H04N 5/2256 348/36 |
| 2013/0002807 A1 | 1/2013 | Vogel et al. |
| 2013/0009588 A1 | 1/2013 | Kawada |
| 2013/0030699 A1 | 1/2013 | Barnes et al. |
| 2013/0044108 A1 | 2/2013 | Tanaka et al. |
| 2013/0048792 A1* | 2/2013 | Szarek .................... B64C 39/024 244/175 |
| 2013/0048855 A1 | 2/2013 | Abreo |
| 2013/0050260 A1 | 2/2013 | Reitan |
| 2013/0079955 A1 | 3/2013 | Masiello et al. |
| 2013/0103303 A1 | 4/2013 | Lynch |
| 2013/0113827 A1 | 5/2013 | Forutanpour et al. |
| 2013/0155229 A1 | 6/2013 | Thornton et al. |
| 2013/0162761 A1* | 6/2013 | Goldemann .......... H04N 5/23238 348/36 |
| 2013/0162867 A1 | 6/2013 | Gupta et al. |
| 2013/0176130 A1 | 7/2013 | Hoesl |
| 2013/0182897 A1 | 7/2013 | Holz |
| 2013/0188010 A1* | 7/2013 | Dortch .................... H04N 5/2251 348/37 |
| 2013/0249947 A1 | 9/2013 | Reitan |
| 2014/0028712 A1 | 1/2014 | Keating et al. |
| 2014/0152874 A1 | 6/2014 | Clayton et al. |
| 2014/0176565 A1 | 6/2014 | Adeyoola et al. |
| 2014/0192184 A1 | 7/2014 | Wu et al. |
| 2014/0282275 A1 | 9/2014 | Everitt et al. |
| 2014/0333776 A1 | 11/2014 | Dedeoglu et al. |
| 2014/0340427 A1 | 11/2014 | Baker |
| 2015/0062337 A1 | 3/2015 | Scalisi |
| 2015/0116741 A1 | 4/2015 | Ogino et al. |
| 2015/0161779 A1 | 6/2015 | Hamann et al. |
| 2015/0297949 A1 | 10/2015 | Aman et al. |
| 2015/0304532 A1* | 10/2015 | Bart .................... H04N 5/2252 901/9 |
| 2015/0334303 A1 | 11/2015 | Dortch et al. |
| 2015/0365607 A1 | 12/2015 | Yang et al. |
| 2016/0005435 A1 | 1/2016 | Campbell et al. |
| 2016/0006382 A1 | 1/2016 | Dortch et al. |
| 2016/0021295 A1 | 1/2016 | Krestyannikov |
| 2016/0088287 A1 | 3/2016 | Sadi et al. |
| 2016/0105609 A1 | 4/2016 | Pettegrew et al. |
| 2016/0225159 A1 | 8/2016 | Sato |
| 2016/0266380 A1 | 9/2016 | Dortch |
| 2016/0321779 A1 | 11/2016 | Fujita |
| 2017/0024898 A1 | 1/2017 | Spector et al. |
| 2017/0124622 A1 | 5/2017 | Kliper |
| 2017/0223368 A1 | 8/2017 | Abbas et al. |
| 2017/0236300 A1 | 8/2017 | Dortch et al. |
| 2017/0241589 A1* | 8/2017 | Wang .................... F16M 11/08 |
| 2017/0264796 A1* | 9/2017 | Tian .................... H04N 5/2252 |
| 2018/0198989 A1 | 7/2018 | Macmillan et al. |
| 2018/0269763 A1* | 9/2018 | Lin .................... H02K 1/146 |
| 2018/0276480 A1 | 9/2018 | Peterson et al. |
| 2018/0286075 A1 | 10/2018 | Jones et al. |
| 2018/0307352 A1 | 10/2018 | Stimm |
| 2020/0154048 A1 | 5/2020 | Jones et al. |

FOREIGN PATENT DOCUMENTS

| | | |
|---|---|---|
| CN | 1639751 A | 7/2005 |
| CN | 102176270 A | 9/2011 |
| CN | 102280005 A | 12/2011 |
| CN | 102868345 B | 4/2015 |
| EP | 2319236 A1 | 5/2011 |
| EP | 2492883 A1 | 8/2012 |
| EP | 3030935 A1 | 6/2016 |
| EP | 3103257 A1 | 12/2016 |
| GB | 2433127 A | 6/2007 |
| GC | 2014/27716 | 8/2014 |
| JP | 2000-236461 A | 8/2000 |
| JP | 2003-123157 A | 4/2003 |
| JP | 2006-013832 A | 1/2006 |
| JP | 2006-333133 A | 12/2006 |
| JP | 2007-271869 A | 10/2007 |
| JP | 2008-236632 A | 10/2008 |
| JP | 2011-199750 A | 10/2011 |
| JP | 2011-239195 A | 11/2011 |
| JP | 2012-065273 A | 3/2012 |
| JP | 2012-113204 A | 6/2012 |
| KR | 10-2009-0067762 A | 6/2009 |
| KR | 10-1030719 B1 | 4/2011 |
| RU | 2012140240 A | 3/2014 |
| TW | 401687 B | 8/2000 |
| WO | 2004/008407 A1 | 1/2004 |
| WO | 2010/010497 A1 | 1/2010 |
| WO | 2012/007049 A1 | 1/2012 |
| WO | 2012/029063 A1 | 3/2012 |
| WO | 2013/109742 A1 | 7/2013 |
| WO | 2013/109976 A1 | 7/2013 |
| WO | 2014/169061 A1 | 10/2014 |
| WO | 2014/169066 A1 | 10/2014 |
| WO | 2015/021186 A1 | 2/2015 |
| WO | 2015/118370 A1 | 8/2015 |
| WO | 2016/160794 A1 | 10/2016 |

OTHER PUBLICATIONS

Austin, David, "Generate Stepper-Motor Speed Profiles in Real Time," Dec. 30, 2004, 13 pages, Available at https://www.embedded.com/design/mcus-processors-and-socs/4006438/Generate-steooer-motor-speed-profiles-in-real-time.

(56) References Cited

OTHER PUBLICATIONS

Chu, Elbert, "Invention Awards 2014: 360-Degree Infrared Vision", Popular Science, May 5, 2014, Web Accessed Feb. 27, 2015.
Electro Optical Industries "Spynel-M Thermal Radar for Intrusion Detection," based on information and belief, available at least as early as Mar. 7, 2018, 4 pages.
European Search Report for Application 14782980.8 dated Dec. 2, 2016, 8 pages.
Extended European Search Report for 19167565.1 dated Jun. 7, 2019.
Final Office Action received for U.S. Appl. No. 14/652,006, dated Mar. 22, 2016.
Hughes et al., "Electromagnetic Damping in Stepping Motors", in Proceedings of the Institution of Electrical Engineers, vol. 122, No. 8, Published Aug. 1, 1975.
International Search Report and Written Opinion for PCT/US2016/024694 dated Jun. 24, 2016, 14 pages.
KR-10-2009-0067762A Machine Transtion retrieved from K-PION website.
Non-Final Office Action received for U.S. Appl. No. 16/746,550, dated Sep. 17, 2020, 17 pages.
Notice of Allowance received for U.S. Appl. No. 13/745,514, dated Apr. 11, 2014.
Notice of Allowance received for U.S. Appl. No. 14/456,329, dated Jan. 21, 2016.
Notice of Allowance received for U.S. Appl. No. 14/652,009, dated Apr. 18, 2016.
Notice of Allowance received for U.S. Appl. No. 14/738,391, dated Aug. 4, 2016.
Notice of Allowance received for U.S. Appl. No. 15/159,523, dated Jul. 11, 2018.
Notice of Allowance received for U.S. Appl. No. 15/562,798, dated Mar. 18, 2019.
Notice of Allowance received for U.S. Appl. No. 16/143,153, dated Oct. 18, 2019.
Notice of Allowance received for U.S. Appl. No. 29/523,032, dated Jul. 20, 2016.
Office Action received for U.S. Appl. No. 13/745,514, dated Jan. 10, 2014.
Office Action received for U.S. Appl. No. 14/456,329, dated Oct. 1, 2015.
Office Action received for U.S. Appl. No. 14/652,006, dated Jul. 12, 2016.
Office Action received for U.S. Appl. No. 14/652,006, dated Nov. 20, 2015.
Office Action received for U.S. Appl. No. 14/652,009, dated Nov. 18, 2015.
Office Action received for U.S. Appl. No. 14/738,391, dated Apr. 25, 2016.
Office Action received for U.S. Appl. No. 15/159,523, dated Feb. 12, 2018.
Office Action received for U.S. Appl. No. 15/562,798, dated Nov. 8, 2018.
Office Action received for U.S. Appl. No. 16/143,153, dated Jun. 26, 2019.
Office Action received for U.S. Appl. No. 29/523,032, dated Apr. 21, 2016.
Restriction Requirement received for U.S. Appl. No. 14/456,329, dated May 14, 2015.
Supplemental European Search Report for 14782980 completed Nov. 24, 2016.
Supplemental European Search Report for 14835456.6 dated May 11, 2017, 11 pages.
U.S. Appl. No. 14/456,329, filed Aug. 11, 2014, Dortch.
U.S. Appl. No. 14/652,006, filed Feb. 22, 2017, Notice of Allowance.
U.S. Appl. No. 14/652,006, filed Oct. 21, 2016, Final Office Action.
U.S. Appl. No. 14/652,009, filed Jun. 12, 2015, Dortch, et al.
U.S. Appl. No. 14/738,391, filed Jun. 12, 2015, Dortch, et al.
U.S. Appl. No. 15/159,523, filed May 19, 2015, Dortch.
U.S. Appl. No. 15/159,523, filed Sep. 8, 2017, Office Action.
U.S. Appl. No. 15/369,117, filed Dec. 5, 2016, Dortch.
U.S. Appl. No. 29/523,032, filed Apr. 6, 2015, Dortch, et al.
U.S. Application filed Sep. 26, 2018 by Jones et al., U.S. Appl. No. 16/143,153.
U.S. Appl. No. 29/669,489, filed Nov. 8, 2018, by Thermal Imaging Radar, LLC.
U.S. Appl. No. 14/652,006, filed Jun. 12, 2015, Dortch et al.
Beek et al., "Server-Side Playout Delay Management for Video Streaming", Image processing, 2006 IEEE international conference on, IEEE, Oct. 1, 2006, pp. 3077-3080.
Cimtay et al., "Frame rate up-conversion with nonlinear temporal interpolation", Image and Signal Processing (Cisp), 2012 5th International Congress on, IEEE, Oct. 16, 2012, pp. 206-210.
Non-Final Office Action received for U.S. Appl. No. 29/669,489, dated Oct. 28, 2021, 6 pages.
Notice of Allowance received for U.S. Appl. No. 29/669,489, dated Jul. 7, 2022, 8 pages.
Office Action received for U.S. Appl. No. 29/669,489, dated Feb. 25, 2022, 2 pages.

\* cited by examiner

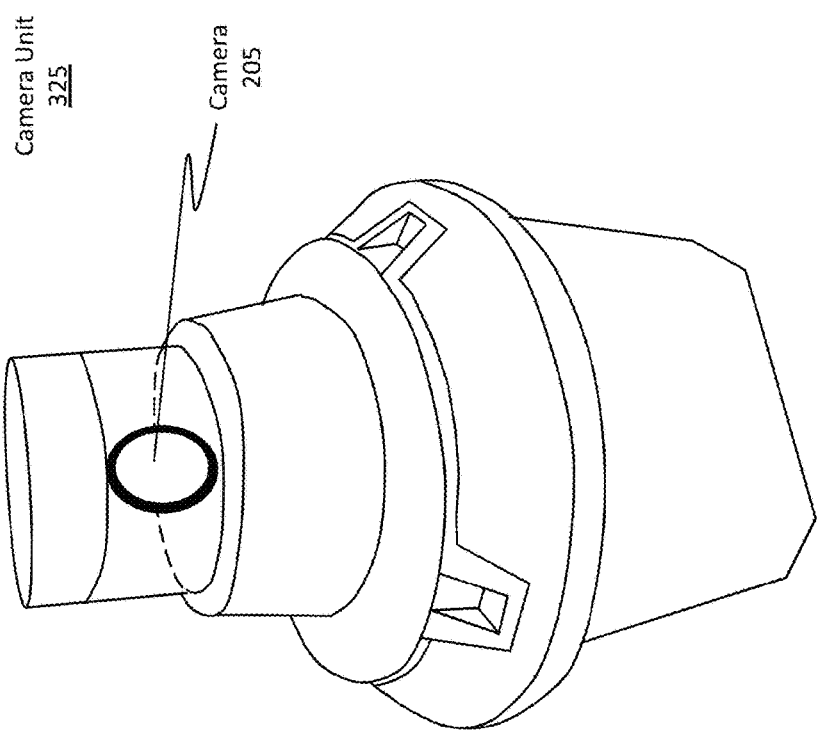
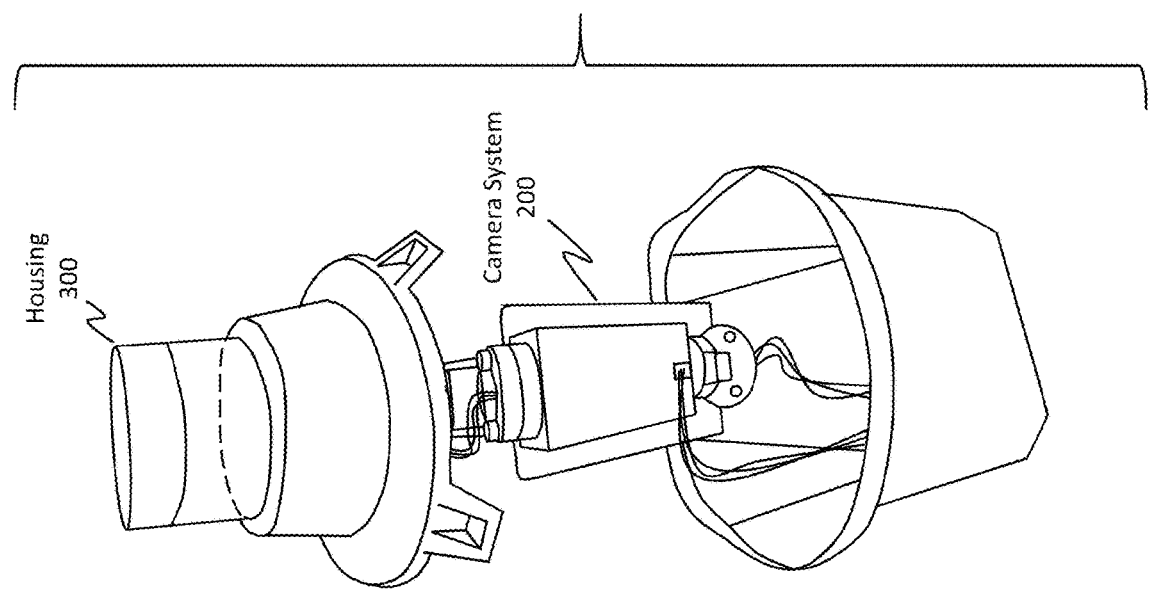
Figure 3B

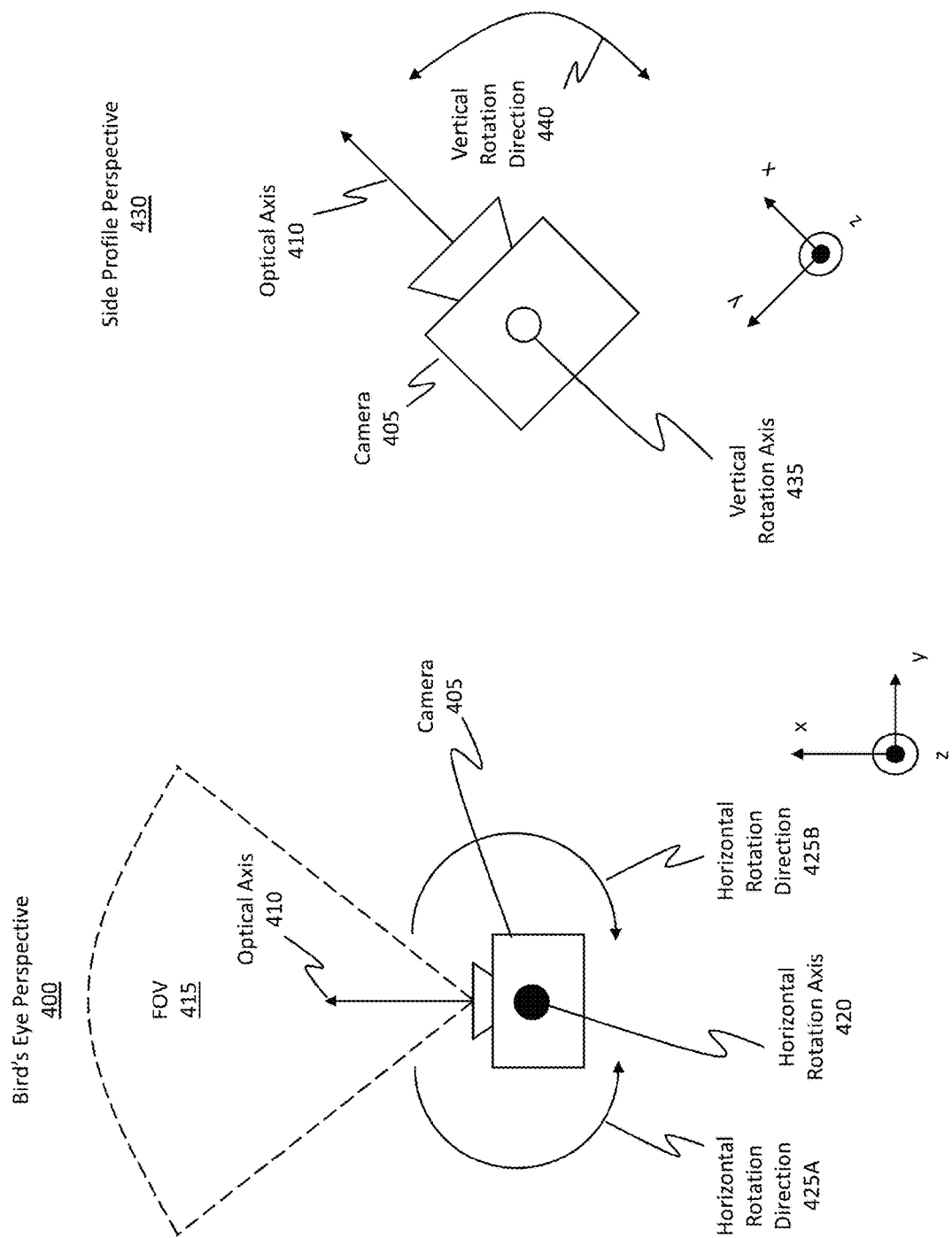

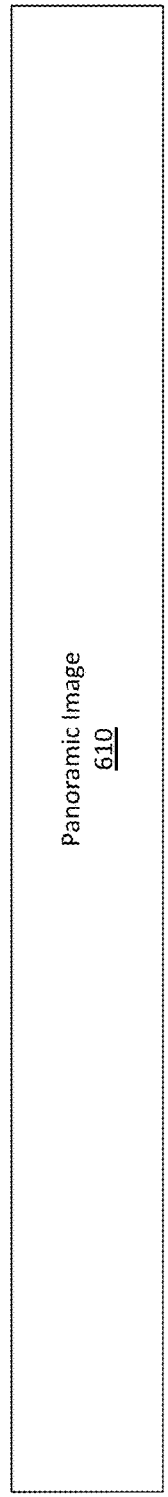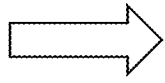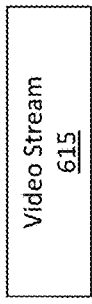
*Figure 6A*

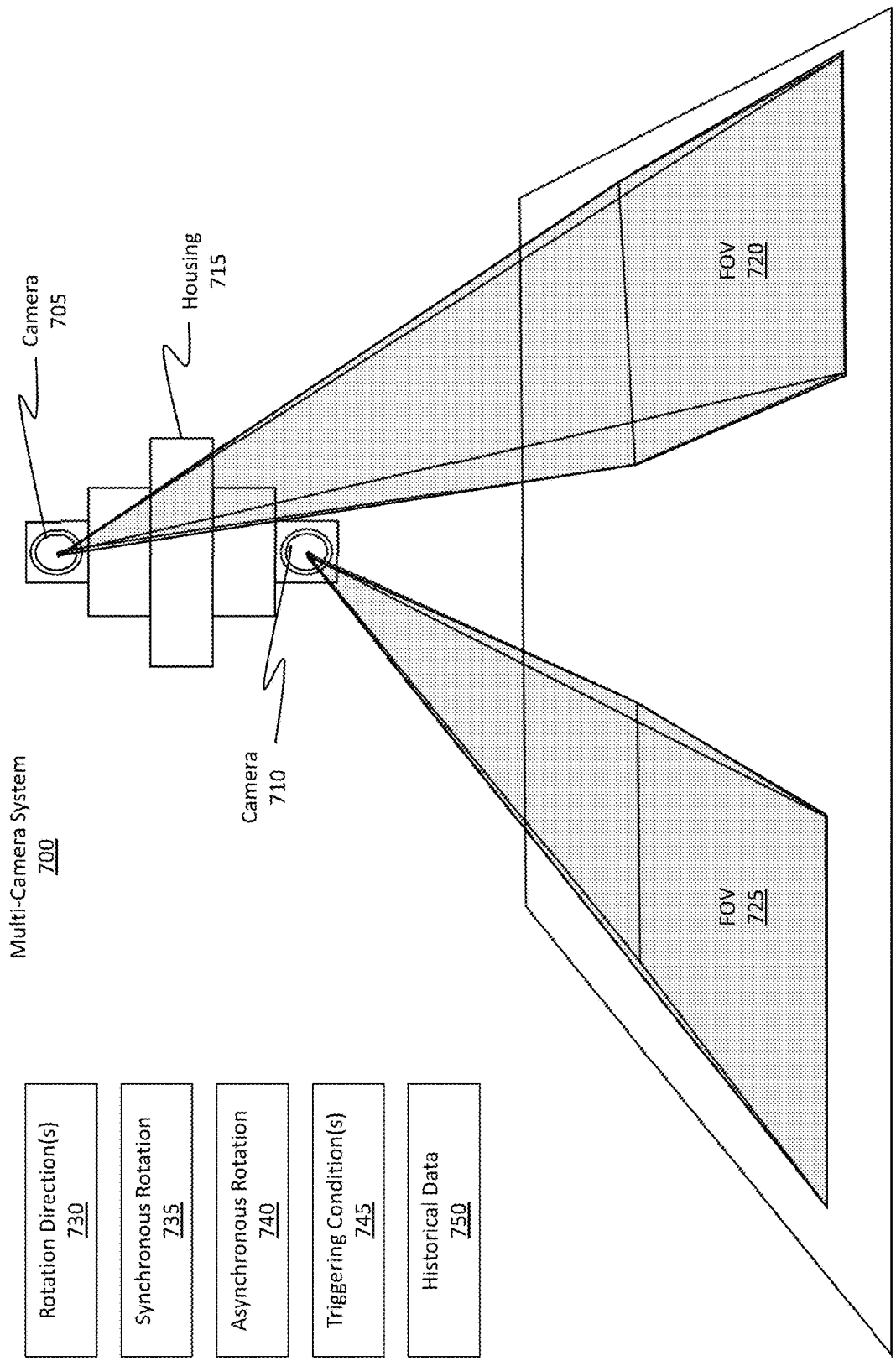

THERMAL IMAGING CAMERA DEVICE

CROSS-REFERENCE TO RELATED APPLICATIONS

This application claims the benefit of and priority to U.S. Provisional Patent Application Ser. No. 62/939,463 filed on Nov. 22, 2019 and entitled "IMPROVED THERMAL IMAGING CAMERA DEVICE," which application is expressly incorporated herein by reference in its entirety.

BACKGROUND

Computer systems and related technology impact many aspects of society. Indeed, the computer system's ability to process information has transformed the way we live and work.

Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

Cameras (which may be a type of computer system) and other security equipment (e.g., motion sensors, alarms, locks, lights, and so forth) may be configured to communicate with other computer systems to allow for displaying and/or interacting with such equipment. In a specific example, businesses and individuals often utilize a video management system (VMS) that can provide management of multiple security devices located on a site that the businesses or individuals may desire to monitor. Where a camera may not technically be configured to provide video image data in a format compatible with such VMS, such existing video management systems may not be capable of accepting such image data for display. Therefore, although there are numerous techniques for using a camera to monitor conditions, there are still many areas in which this technology sector can be improved.

In addition, while Applicant's U.S. Pat. Nos. 9,886,776 and 9,516,208, as well as various other patents of Applicant, disclose thermal imaging camera systems providing surveillance of a panoramic region by rotating a single camera through a plurality of stop positions, these existing systems can still be improved upon, to provide increased versatility, durability, reliability, and the like.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices that improve how image data (particularly thermal image data) is acquired.

In some embodiments, a rotating camera system is configured to rotate about a central axis to temporarily aim an optical axis of a camera sensor at directions spanning a 360-degree field of view laterally surrounding the base of the rotating camera system in order to generate certain images while aimed in those directions. To do so, the rotating camera system may include an uncooled thermal imaging sensor configured to generate thermal images based on a direction of its optical axis. The system may also include an electrically powered rotary actuator. This actuator includes a rotating shaft that is physically coupled to the uncooled thermal imaging sensor and that enables the uncooled thermal imaging sensor to rotate with the rotating shaft a full 360 degrees any number of times. The rotating shaft may also include a hollowed central portion through which an electrical connection of the uncooled thermal imaging sensor passes through. Consequently, the electrical connection rotates in unison with both the uncooled thermal imaging sensor and the rotating shaft. The system may further include a rotary encoder configured to determine an angular position of the rotating shaft. The system may also include a slip ring affixed to the rotating shaft. The slip ring provides an electrical coupling transition (and data and power connections) between the rotating uncooled thermal imaging sensor and a stationary connection so that the rotating uncooled thermal imaging sensor can be dynamically controlled.

In some embodiments, a camera system, which may include some of the features discussed above, is configured to acquire thermal image data. For example, a first movement of the uncooled thermal imaging sensor can be controlled via the rotary actuator to cause an optical axis of the sensor to be directed toward a first determined direction. While at that position and facing that direction, the sensor can be used to generate a first thermal image, or first set of thermal images. Then, the rotary actuator can again be controlled to rotate the sensor to a new position. While at this new position, the sensor can again be activated to generate one or more additional thermal images. The two images or sets of images can be transmitted to an external computing device. These images or sets of images can be compiled into a single data stream or kept separate in different data streams.

In some embodiments, a group of one or more uncooled thermal imaging sensors can be controlled to generate thermal image data. For each uncooled thermal imaging sensor included in the group, the following two operations may be performed. One operation includes controlling a corresponding movement of each one of the sensors to cause each sensor to be aimed at a corresponding direction. Then, while each sensor is aimed at its corresponding direction, images are generated using those sensors. Subsequently, the thermal images are received from each one of the sensors. These images are compiled into a data stream comprising a multi-degree field of view and transmitted to an external device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3B illustrates how the camera system may be fitted inside of the protective housing.

FIGS. 4A and 4B illustrate how the camera system can be rotated in different directions, both horizontally and vertically.

FIGS. 6A, 6B, and 6C illustrate how the generated images can be fused, stitched, merged, or otherwise combined and how the resulting combination can also be transmitted in a data stream to another device.

FIG. 7 illustrates a multi-camera system and how the different cameras can operate to acquire thermal image data.

DETAILED DESCRIPTION

Figure 1A:
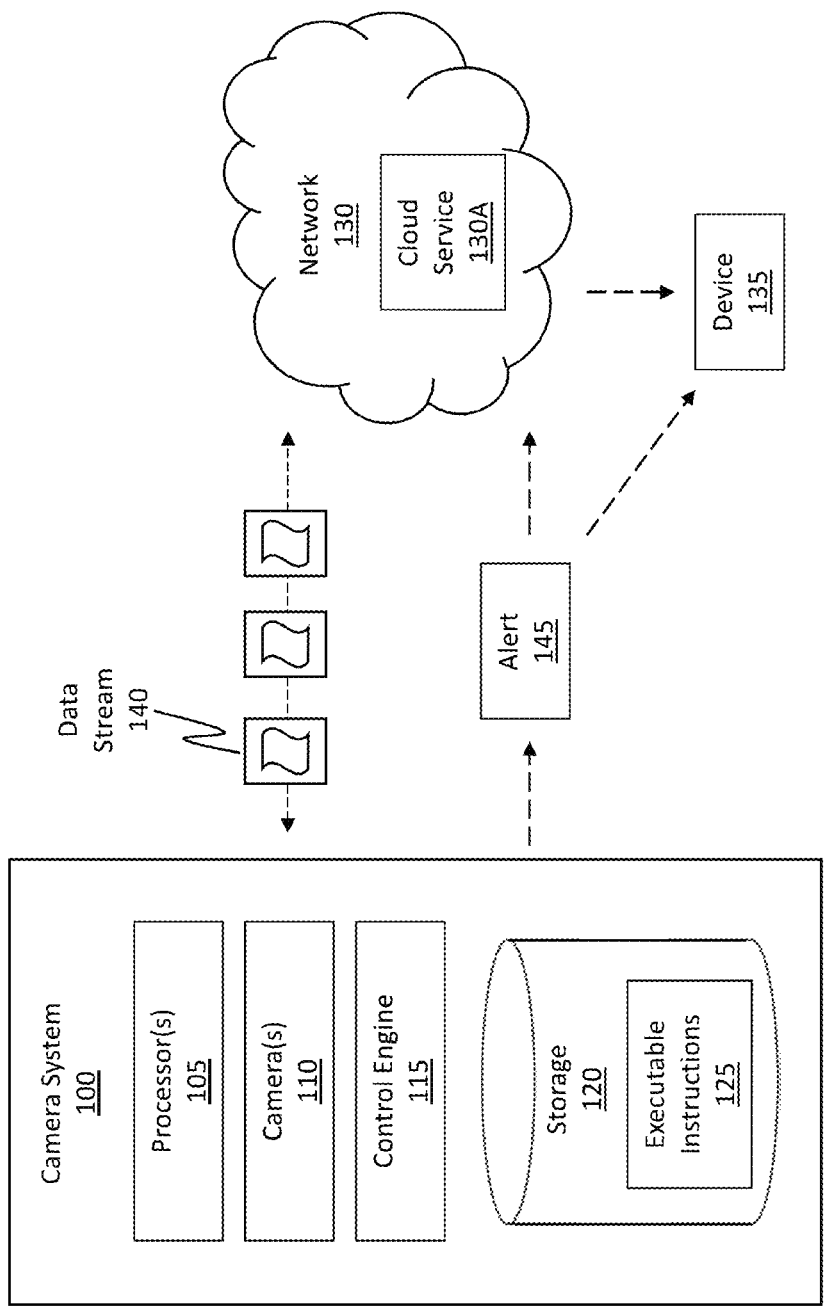
FIG. 1A illustrates an example camera system that may be structured or configured to perform any of the disclosed operations.

Embodiments disclosed herein relate to systems, methods, and devices that improve how thermal image data is acquired.

In some embodiments, a rotating camera system includes an uncooled thermal imaging sensor that generates thermal images. The system also includes a rotary actuator that rotates the sensor a full 360 degrees any number of times (e.g., 360 degrees, 720 degrees, 1,080 degrees, 1,440 degrees, and so on). The actuator includes a hollowed central portion through which an electrical connection of the sensor can pass through. The system further includes a rotary encoder that determines an angular position of the rotating sensor. The system also includes a slip ring, which provides an electrical coupling transition between the rotating sensor and a stationary connection.

In some embodiments, a camera system, which may include some of the features discussed above, is configured to acquire thermal image data. Here, a first movement of the sensor is controlled via the actuator to cause the sensor to be directed toward a first determined direction. While facing that direction, the sensor generates a first set of thermal images. The actuator then rotates the sensor to a new position. While at this new position, the sensor is again activated and generates additional thermal images. The two image sets can be transmitted to an external computing device either in a single data stream or in multiple data streams.

In some embodiments, a group of one or more uncooled thermal imaging sensors are controlled to generate thermal image data. The sensors are each aimed at a corresponding direction, and they then generate thermal images. Subsequently, those thermal images are compiled into a data stream comprising a multi-degree field of view and transmitted to an external device.

Some embodiments are specifically focused on using the rotating camera system in a specific use-case scenario. Specifically, a rotating camera system configured in the manner described above may be placed in an environment to monitor a determined set of conditions. Once placed in the environment, the rotating camera system can be activated to cause the rotating camera system to begin monitoring the environment. The rotating camera system can then be used to detect the specific set of conditions occurring within the environment. In response to detecting those conditions, an alert can then be sent. As used herein, the terms "configured" and "structured" may be interchangeable with one another and can, in some instances, generally refer to the process of modifying an item of interest (e.g., a physical object, a software application, etc.) to achieve a designed specification or a designed characteristic.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the current technical field. In particular, the embodiments improve how thermal image data is acquired by using a specialized type of camera system. This camera system has a form factor that provides for any number of unique modifications and adjustments and allows for the system to be dynamically controlled. The system is also designed to operate automatically for an extended period of time (e.g., many years) without requiring maintenance. Additionally, the camera hardware components can (though they are not required to) be combined into a single integrated unit (or within a single chassis) as opposed to being distributed. While the hardware may be integrated into a single unit, the software controls can be placed at any location to enable the system to be controlled remotely.

The disclosed embodiments also operate to improve how a camera (e.g., an uncooled thermal imaging sensor) functions by enabling the sensor and its peripheral parts (e.g., wires, mounts, etc.) to be packaged together in a robust manner. The system further improves how image data is processed by enabling machine learning and other analysis techniques to be applied to the image data. By doing so, the system can acquire image data at a faster rate and with less hardware (e.g., using a motor positioned in-line with the camera and/or using a rotating camera as opposed to requiring multiple different cameras, though multiple cameras can be used in the disclosed embodiments). Accordingly, the disclosed embodiments provide substantial benefits that will be described in more detail throughout the remaining portions of this disclosure. As used herein, when reference is made to a "camera," such a reference should be understood as referring to at least an "uncooled thermal imaging sensor" unless stated otherwise. Of course, other types of cameras (e.g., visible light cameras, depth detection cameras, etc.) may additionally be included in a reference to a camera.

Example Computer/Camera Systems

Initially, attention will be directed to FIG. 1A which illustrates an example camera system 100 that may include and/or be used to perform any of the operations described herein. Camera system 100 may take various different forms. For example, camera system 100 may be embodied as a tablet, a desktop, a laptop, a mobile device, or a standalone device, such as those described throughout this disclosure. Camera system 100 may also be a distributed system that includes one or more connected computing components/devices that are in communication with camera system 100.

In its most basic configuration, camera system 100 includes various different components. FIG. 1A shows that camera system 100 includes one or more processor(s) 105 (aka a "hardware processing unit"), one or more camera(s) 110, a control engine 115, and storage 120.

Regarding the processor(s) 105, it will be appreciated that the functionality described herein can be performed, at least in part, by one or more hardware logic components (e.g., the processor(s) 105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Camera(s) 110 can include any type of camera. For instance, turning briefly to FIG. 1B, camera(s) 110 can include any type of thermal camera (or thermal imaging sensor) 110A, any type of visible light camera 110B, and any type of depth detection camera 110C. The ellipsis 110D demonstrates that any other type of camera may be included among camera(s) 110, without limitation.

Figure 1B:
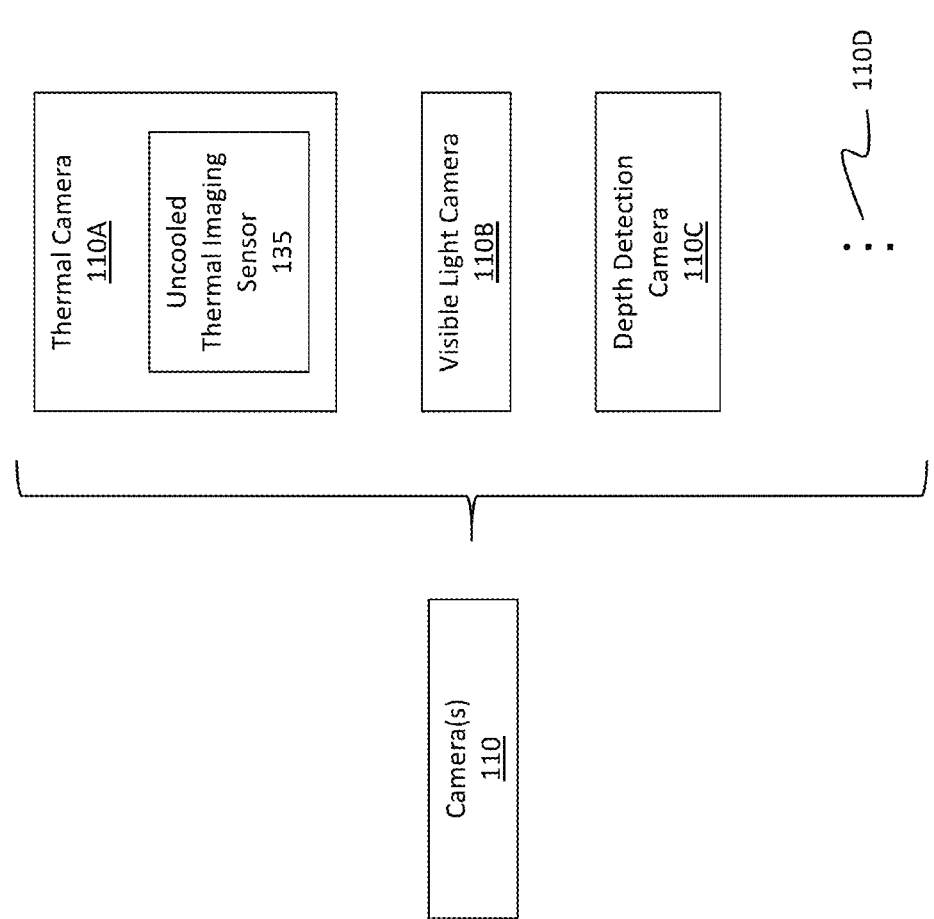
FIG. 1B illustrates how the camera system includes at least an uncooled thermal imaging sensor and may potentially also include a visible light camera and a depth detection camera.

FIG. 1B also shows how the thermal camera 110A may be embodied as an uncooled thermal imaging sensor 135. Uncooled thermal imaging sensor 135 uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer can detect a temperature-dependent electrical resistance. That is, changes to environmental temperature causes changes to the bolometer's temperature, and these changes can be converted into an electrical signal to thereby produce a thermal image of the environment. In accordance with at least some of the disclosed embodiments, the uncooled thermal imaging sensor 135 is used to generate any number of thermal images.

The bolometer of the uncooled thermal imaging sensor 135 can detect electromagnetic radiation across a wide spectrum, spanning the far-infrared spectrum all the way up to millimeter-sized waves. For instance, electromagnetic radiation in the infrared spectrum has wavelengths spanning about 760 nanometers up to about 1 millimeter and with frequencies between about 3 gigahertz (GHz) up to about 400 terahertz (THz). The bolometers used herein can detect electromagnetic wavelengths across the entire infrared (IR) spectrum.

Regarding the visible light camera 110B, this type of camera can detect electromagnetic radiation having wavelengths in the visible light spectrum, which spans from about 380 nanometers up to about 740 nanometers. These types of cameras include, without limitation, charge-coupled devices (CCD), complementary metal-oxide semiconductor (CMOS) cameras, metal-oxide semiconductor (MOS) devices, or even n-type MOS (NMOS) devices. Any other type of visible light camera may be included in the disclosed embodiments.

Similarly, any type of depth detector may be included in the depth detection camera 110C. Examples include, but are not limited to, stereoscopic cameras (both active illumination and passive (i.e. no illumination)), time of flight cameras, range finders, or any other type of range or depth sensor.

Returning to FIG. 1A, the control engine 115 may be implemented as a specific processing unit (e.g., a dedicated processing unit as described earlier) configured to perform one or more specialized operations for the camera system 100. As used herein, the terms "executable module," "executable component," "component," "module," or "engine" can refer to hardware processing units or to software objects, routines, or methods that may be executed on camera system 100. The different components, modules, engines, and services described herein may be implemented as objects or processors that execute on camera system 100 (e.g. as separate threads). The control engine 115 (or perhaps even just the processor(s) 105) can be configured to perform any of the disclosed method acts or other functionalities.

Storage 120 may be physical system memory, which may be volatile, non-volatile, or some combination of the two. The term "memory" may also be used herein to refer to non-volatile mass storage such as physical storage media. If camera system 100 is distributed, the processing, memory, and/or storage capability may be distributed as well.

Storage 120 is shown as including executable instructions 125. The executable instructions 125 represent instructions that are executable by the processor(s) 105 (or perhaps even the control engine 115) of camera system 100 to perform the disclosed operations, such as those described in the various methods.

The disclosed embodiments may comprise or utilize a special-purpose or general-purpose computer including computer hardware, such as, for example, one or more processors (such as processor(s) 105) and system memory (such as storage 120), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Camera system 100 may also be connected (via a wired or wireless connection) to external sensors (e.g., one or more remote cameras) or devices via a network 130. For example, camera system 100 can communicate with any number devices (e.g., device 135) or cloud services (e.g., cloud service 130A) to obtain or process data. In some cases, network 130 may itself be a cloud network. Furthermore, camera system 100 may also be connected through one or more wired or wireless networks 130 to remote/separate computer systems(s) that are configured to perform any of the processing described with regard to camera system 100.

A "network," like network 130, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Camera system 100 (i.e. a type of computer system) will include one or more communication channels that are used to communicate with the network 130. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As will be described in more detail later, camera system 100 is also able to send and/or receive a data stream 140 comprising camera image data (e.g., thermal image data, visible light image data, depth data, etc.) as well as other information (e.g., global positioning system (GPS) data, temperature readings, etc.). In some cases (as will be discussed in more detail later), the camera system 100 can also send or receive an alert 145 either through the network 130 or directly to another computing device (e.g., device 135). Accordingly, camera system 100 is configured to perform any number of computing operations.

Physical Attributes of a Camera System

Figure 2A:
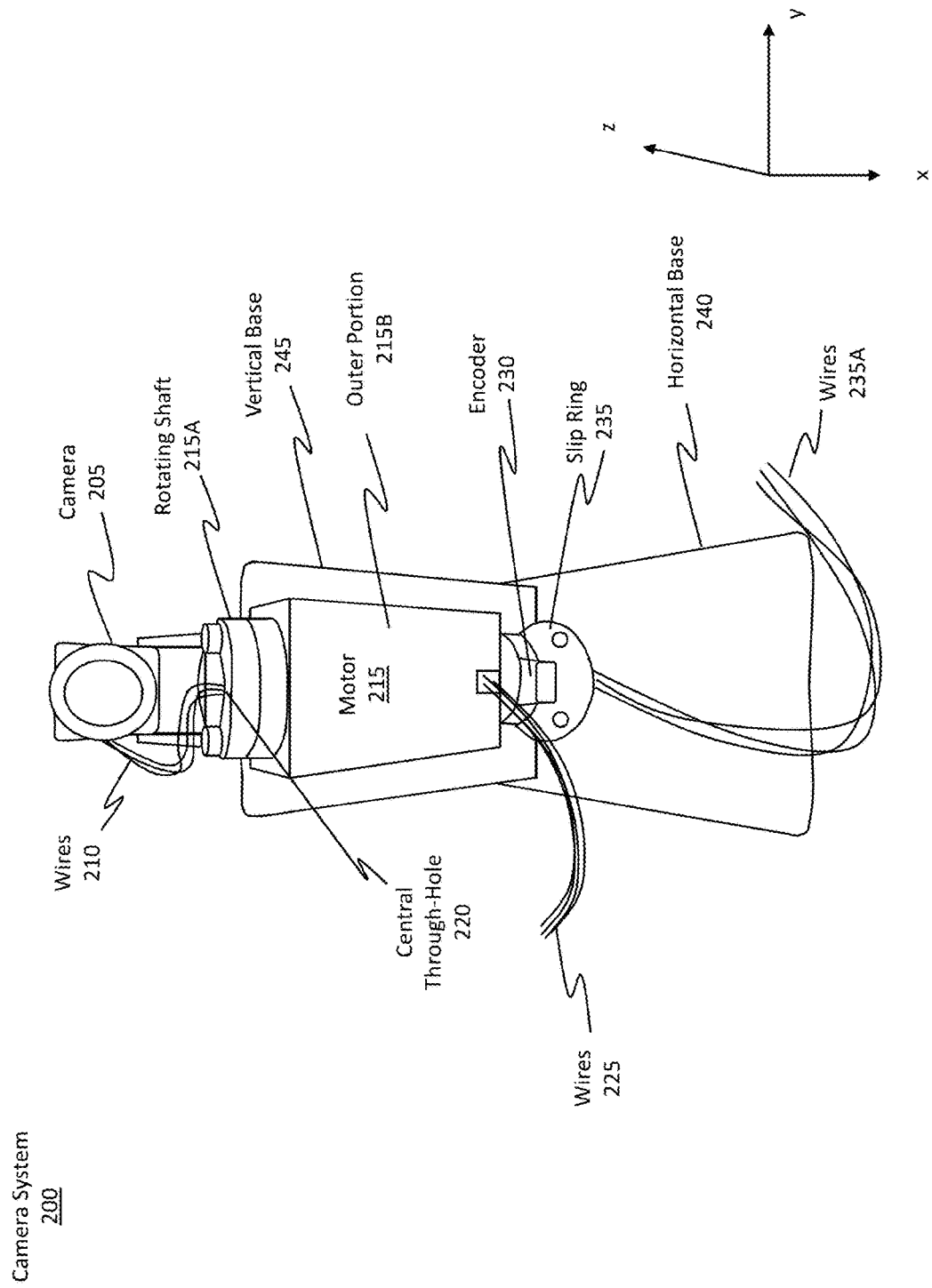
FIG. 2A illustrates a specific example of a camera system, including its various components.

Having just described some of the computing capabilities of the disclosed camera system, attention will now be directed to FIG. 2A, which illustrates some of the structural/physical characteristics and attributes of an example camera system 200. One will appreciate that camera system 200 may be an example representation of camera system 100 from FIG. 1A such that camera system 200 may include all of the features and operational characteristics of camera system 100.

In some embodiments, camera system 200 is a rotating camera system configured to rotate about a central axis (to be described in more detail later). This rotation allows the camera system 200 to temporarily aim an optical axis (i.e. the line passing through the center of the camera's lens) of a camera sensor of the rotating camera system at directions spanning a 360-degree field of view (FOV). In some cases, this 360-degree FOV is oriented laterally/horizontally relative to a base of the rotating camera system. By rotating in this manner, the camera system 200 can generate one or more image(s) while the camera sensor's optical axis is temporarily aimed at each one of the different directions.

While reference is made to the terms "horizontally" and "vertically," one will appreciate that such directional orientations may not necessarily be made with reference to earth's gravity. Instead, such orientations are typically referencing a base of the camera system 200. Thus, the camera system 200 can be mounted at different angles and the camera can still rotate "horizontally" and "vertically" relative to the base, even though the camera is not rotating "horizontally" and "vertically" relative to the gravity vector.

As shown in FIG. 2A, camera system 200 includes at least one camera 205. Camera 205 specifically includes an uncooled thermal imaging sensor, such as the uncooled thermal imaging sensor 135 described in FIG. 1B. Of course, camera system 200 may include any number or type of other/additional cameras, as described earlier. Additionally, camera system 200 includes wires 210 (i.e. a type of electrical coupling connection) that enable the camera 205 to be electrically coupled to any number of other devices and/or to be powered, as will be described in further detail later.

The uncooled thermal imaging sensor of camera 205 is configured or structured to generate one or more thermal image(s) of a surrounding environment in the manner described earlier (e.g., via use of the bolometer). These thermal images are generated based on a direction of an optical axis of the uncooled thermal imaging sensor.

Camera system 200 also includes a motor 215. In some embodiments, motor 215 is structured as a 5-phase stepper motor (i.e. an electrically powered rotary actuator). In some implementations, the rotary actuator comprises a rotor and a stator. Any type of 5-phase stepper motor may be used, including a permanent magnet type, a variable reluctance type, and a hybrid type. The following discussion will focus on the permanent magnet type, but one will appreciated that any of the other types may be used as well.

The rotor typically includes a first geared rotor (i.e. teeth or gears on the outside diameter of the rotor), a second geared rotor, and a permanent magnet sandwiched or positioned in-between the first and second rotors. The outer diameters of the first and second rotors envelope the outer diameter of the permanent magnet such that the permanent magnet is not visible from an outside perspective.

The first geared rotor contacts the north pole of the magnet and thus is magnetized by the north pole. Similarly, the second geared rotor contacts the south pole of the magnet and thus is magnetized by the south pole. With this configuration, the first and second rotors are connected to one another and will rotate as a single unit. When viewed from a lateral side perspective, the teeth of the second geared rotor are shifted in position by one tooth offset relative to the position of the first geared rotor. As a consequence, when viewed from the lateral side perspective, the teeth alternate in polarity (e.g., north, south, north, south, etc.).

As evidenced by its name, the 5-phase motor includes 5 phases (e.g., phase A, B, C, D, and E), with each phase comprising two protruding physical parts located on opposite ends of the circular stator. To clarify, the phases are protruding physical parts included within the stator and can operate as electromagnets (such that their magnetic polarities can be controlled).

When the phase A portion/part of the stator has a direct current (DC) applied to it, phase A's becomes magnetized with a south pole polarity. As a consequence, the teeth in the first geared rotor, which teeth have a north pole polarity, are attracted to the south pole polarity now provided by phase A. Relatedly, the teeth in the second geared rotor, which teeth have a south pole polarity, are repelled by the south pole polarity provided by phase A. In this scenario, therefore, the first and second geared rotors end up at a position where the magnetic attractions associated with those two units are balanced.

By switching the excitation (i.e. by selectively applying DC current) between the different phases (phases A, B, C, D, and E), the 5-phase motor can be controlled to rotate about a central axis (to be shown later in the Figures). One will appreciate how the size of each step for the 5-phase motor is dependent on the number of phases (here, the number is 5). In some embodiments, the stepping distance of the 5-phase motor can be as low as 0.0001 of a rotational distance (i.e. $1/10,000^{th}$ of a rotation). As will be described in further detail later, the motor can be positioned in-line with the uncooled thermal imaging sensor (or perhaps some determined offset relative to the sensor) and can be connected to the rotor portion of the motor to thereby enable the sensor to rotate with the rotor portion.

As shown in FIG. 2A, the rotary actuator comprises a rotating shaft 215A that is physically coupled to the uncooled thermal imaging sensor (i.e. camera 205). Here, the rotating shaft 215A can be considered as the "rotor" portion of the 5-phase motor. Additionally, rotating shaft 215A enables the uncooled thermal imaging sensor to rotate with the rotating shaft 215A a full 360 degrees any number of times (e.g., 360 degrees, 720 degrees, 1,080 degrees, 1,440 degrees, and so on) relative to the base (e.g., horizontal base 240) of the rotating camera system.

By way of additional clarification, the rotating shaft 215A includes the "rotor" section described earlier while the outer portion 215B of motor 215 includes the "stator" section. In this regard, the combination of the rotating shaft 215A and the outer portion 215B forms the motor 215.

In accordance with at least some of the disclosed embodiments, the rotating shaft 215A includes a hollowed central portion (e.g., central through-hole 220) running the length of the rotating shaft 215A. Through this hollowed central portion, an electrical connection (e.g., wires 210) of the uncooled thermal imaging sensor (e.g., camera 205) passes through such that the electrical connection rotates with the uncooled thermal imaging sensor and the rotating shaft 215A (thereby providing data and also potentially power connections). One will appreciate that the size of the hollowed central portion (i.e. central through-hole 220) running the length of the rotating shaft 215A can be set to any dimension, with the only limitation being the size of the rotating shaft 215A itself. That is, the diameter of the hollowed central portion (i.e. central through-hole 220) is required to be some threshold size smaller than the diameter of the rotating shaft 215A.

In some embodiments, the central through-hole 220 comprises a single through-hole running the length of the rotating shaft 215A. In some additional embodiments, the central through-hole 220 comprises multiple discrete through-holes (e.g., 2, 3, 4, 5, 6, 7, 8, 9, 10, etc.) running the length of the rotating shaft 215A. When multiple discrete through-holes are used, the size of each hole can be set to accommodate a determined number of wires (e.g., wires 210). Additionally, the sizes of these multiple discrete through-holes are not required to all be the same; rather, the sizes can vary. In some embodiments, a first through-hole may accommodate multiple wires (and thus have a relatively larger diameter) while a second through-hole may accommodate only a single wire (and thus have a relatively smaller diameter). Accordingly, the dimensions and configurations of the central through-hole 220 may vary depending on the desired design.

It should be noted that camera 205 is physically mounted or coupled to the rotor section (which is included as a part of the rotating shaft 215A) of motor 215 (i.e. a 5-phase motor). As such, camera 205 rotates at the same rate and in unison with the rotation of the rotor. Similarly, because wires 210 are coupled to camera 205 and are disposed through the central through-hole 220, the wires 210 also rotate at the same rate and in unison with the rotation of the rotor. Accordingly, the camera 205, wires 210, the central through-hole 220, and the rotating shaft 215A all rotate as a single unit while the outer portion 215B remains stationary relative to the rotating shaft 215A. It may also remain stationary relative to a mount (e.g., horizontal base 240 and vertical base 245) and body (e.g., 215B).

In some embodiments, camera system 200 additionally includes an actuator (not illustrated) structured to enable the camera 205 to be aimed in a vertical manner relative to the horizontal base 240. Further details on this feature will be provided later. In any event, some embodiments enable the camera 205 to rotate both in a horizontal direction relative to the horizontal base 240 and in a vertical direction relative to the horizontal base 240.

Camera system 200 is also shown as including wires 225 coupled to the motor 215. Unlike wires 210, which rotate with the rotation of the rotating shaft 215A and which help control the camera 205, wires 225 do not rotate. Additionally, wires 225 can be used to control the operations of the motor 215. Such operations include, but are not limited to, turning the motor 215 on and off, adjusting the rotation rate (RPM or speed), controlling when the rotating shaft 215A of the motor 215 is to stop at a particular stop position while rotating, and so on. In this regard, the motor 215 can be controlled directly in a programmatic manner. Additionally, because of the use of the 5-phase motor, the camera 205 can be directly coupled to the motor 215 (i.e. a direct rotation relationship) as opposed to being connected via a band, chain, or some other coupling connection (i.e. an indirect rotation relationship).

Camera system 200 additionally includes an encoder 230. Encoder 230 is a rotary encoder configured or structured to determine an angular position of the rotating shaft 215A as the rotating shaft 215A rotates relative to the base (e.g., horizontal base 240). It should be noted that the rotating shaft 215A can rotate a full 360 degrees any number of times in both a clockwise direction and a counterclockwise direction. Additionally, the rotating shaft 215A can rotate only a part of the 360 degrees and then stop for a determined period of time and/or switch directions. As such, the rotating shaft 215A is not limited to rotating only a full 360 degrees nor is it limited to rotating in only a single direction.

The angular position of the rotating shaft 215A also corresponds to the angular position of the uncooled thermal imaging sensor's optical axis (i.e. the camera 205's optical axis). Therefore, by determining the angular position of the rotating shaft 215A via use of the encoder 230, the camera system 200 can also determine the angular position of the camera 205's optical axis and thus can determine where the camera 205 is being aimed.

Encoder 230 is a type of electro-mechanical device capable of converting a shaft's angular position or motion into a digital output signal. As will be described in further detail later, the encoder 230 is able to determine the rotating shaft 215A's position relative to a determined "Home" position, which is a position where the rotating shaft 215A starts a rotation and, upon rotating 360 degrees, ends a rotation. As will be described in further detail later, the disclosed embodiments are able to programmatically and/or dynamically establish the home position at any location, such that the home position is not limited to only a single angular position of the rotating shaft 215A. Additionally, the home position can be changed in response to certain input.

Encoder 230 can measure the angular displacement of the rotating shaft 215A relative to the determined home position/location. In some embodiments, encoder 230 is an absolute encoder, which determines the current angular position of the rotating shaft 215A. In some embodiments, encoder 230 is an incremental encoder, which determines information describing the motion of the rotating shaft 215A. One will appreciate how any type of encoder may be used. For instance, example types include, but are not limited to, conductive encoders, optical encoders, on-axis magnetic encoders, off-axis magnetic encoders, and even capacitive encoders. In some embodiments, encoder 230 has a heightened level of accuracy such that it can determine the angular position of the rotating shaft 215A within $1/16,000^{th}$ of a rotation and can provide a full feedback loop for determining the location of the rotating shaft 215A. Consequently, if the rotary actuator (i.e. motor 215) is controlled to point the camera 205 at any specific location, the system has the ability to dynamically monitor and potentially correct itself using encoder 230 to ensure that the camera 205 accurately lands/arrives at the desired location.

Camera system 200 is also shown as including a slip ring 235. Slip ring 235 is another type of electro-mechanical device that enables power and other electrical signals to be transmitted from a rotating structure to a stationary structure. Here, slip ring 235 includes a rotating portion that rotates in unison with the rotation of the camera 205, the wires 210, and the rotating shaft 215A. The wires 210 are electrically coupled to this rotating portion of the slip ring 235.

Slip ring 235 also includes a stationary portion that is electrically coupled to the rotating portion but that does not rotate (i.e. it remains stationary). Through the electrical coupling between the rotating portion and the stationary portion, electrical and power signals can be transmitted from a rotating unit to a stationary unit. The electrical coupling of the slip ring can be provided by a brush configuration, wire-groove configuration, a wireless slip ring configuration, or any other type of slip ring connection, without limitation.

In this regard, slip ring 235 may be affixed to the rotating shaft 215A. The electrical connection (e.g., wires 210) of the uncooled thermal imaging sensor is electrically coupled to a rotating part of the slip ring 235. A non-rotating electrical connection (e.g., wires 235A) is electrically coupled to a non-rotating part of the slip ring 235. The non-rotating part of the slip ring 235 is electrically coupled to the rotating part of the slip ring such that the electrical connection (e.g., wires 210) (e.g., data and power connections) and the non-rotating electrical connection (e.g., wires 235A) are continuously electrically coupled to one another even as the rotating shaft 215A rotates any rotation amount or direction across the available 360 degrees rotational spectrum.

In this regard, wires 235A, which are different from wires 210 but which are electrically coupled to wires 210 via the slip ring 235, are illustrated as being coupled to the stationary portion of the slip ring 235. Accordingly, camera 205 can be controlled and powered via the wires 210 and the wires 235A. Additionally, image data generated by camera 205 can be obtained via the wires 210, slip ring 235, and wires 235A.

In some cases, camera 205 may include wireless transmission abilities such that camera 205 can transmit its image data to another device in a wireless manner. In such a configuration, the wires 210 and 235A may still be used, however, in order to provide electrical power to camera 205.

Camera system 200 is also shown as including a horizontal base 240 and a vertical base 245. In some embodiments, the horizontal base 240 is orthogonal to the rotating shaft 215A. In other embodiments, the horizontal base 240 may be angled to some degree relative to the rotating shaft 215A. Therefore, while the name "horizontal" base 240 suggests that the horizontal base 240 is always perpendicular or orthogonal, that may not always be the case. Similarly, the vertical base 245 may be orthogonal to the horizontal base 240, or it may have some angular offset relative to the horizontal base 240. The x-y-z legend illustrates the direction vectors that will be used as references for the remainder of this disclosure. Specifically, the z-direction is the direction in which the rotating shaft 215A is positioned lengthwise and corresponds to the "height" of the camera system 200; the y-direction corresponds to the "width" of the camera system 200; and the x-direction corresponds to the "depth" of the camera system 200.

Figure 2B:
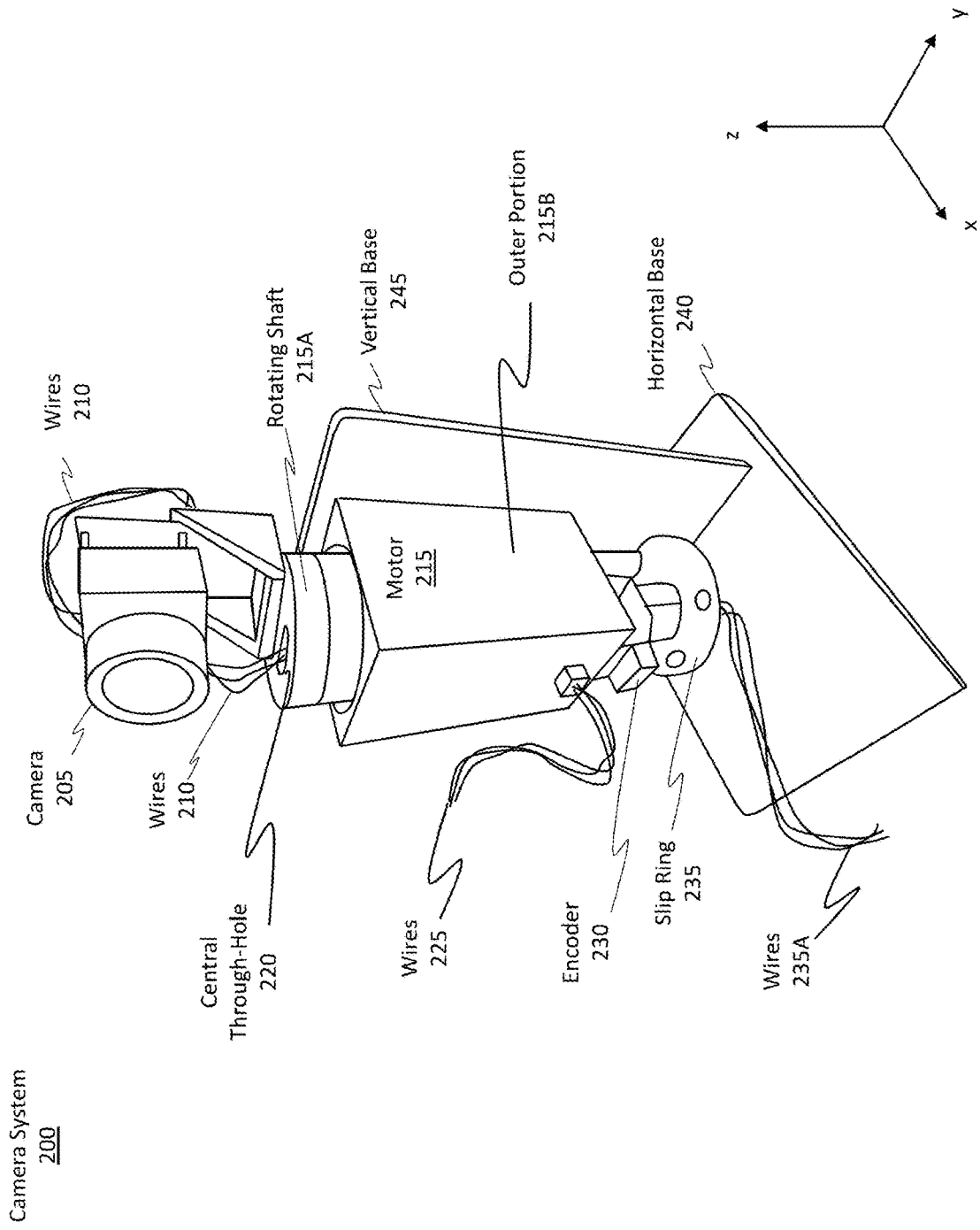
FIG. 2B illustrates a different perspective of the camera system.

FIG. 2B illustrates an angled side perspective view of the camera system 200. The same labels used in FIG. 2A are also used in FIG. 2B and thus the descriptions of those parts need not be repeated. As shown, however, the motor 215 is physically coupled to the vertical base 245. In this regard, the vertical base 245 provides a stationary and sold framework for supporting the camera 205, motor 215, encoder 230, and slip ring 235.

As shown, the horizontal base 240 is not directly connected to any of the camera 205, motor 215, encoder 230, or slip ring 235. Instead, the lower portion or distal end of the vertical base 245 is physically coupled to the horizontal base 240, thereby constituting a secure and solid framework for the entire unit. Together, the horizontal base 240 and the vertical base 245 enable the camera system 200 to be placed on a surface, and the camera system 200 will not topple over (supposing the surface is sufficiently flat or level).

FIG. 2B also provides a more-clear depiction of the central through-hole 220, which spans the length of the rotating shaft 215A. It will be appreciated that the shape of the central through-hole 220 may be set to any shape, including a circular shape, a rounded-corner square-like shape, or even a rounded-corner rectangular shape.

Regarding the dimensions of the camera system 200, the dimensions can be set to any value without limitation. In particular, the dimensions (at time of manufacture) can be set to any size based on the design criteria and operational restrictions. As such, there is no specific size or dimension required by the disclosed embodiments.

Protective Enclosures

Figure 3A:
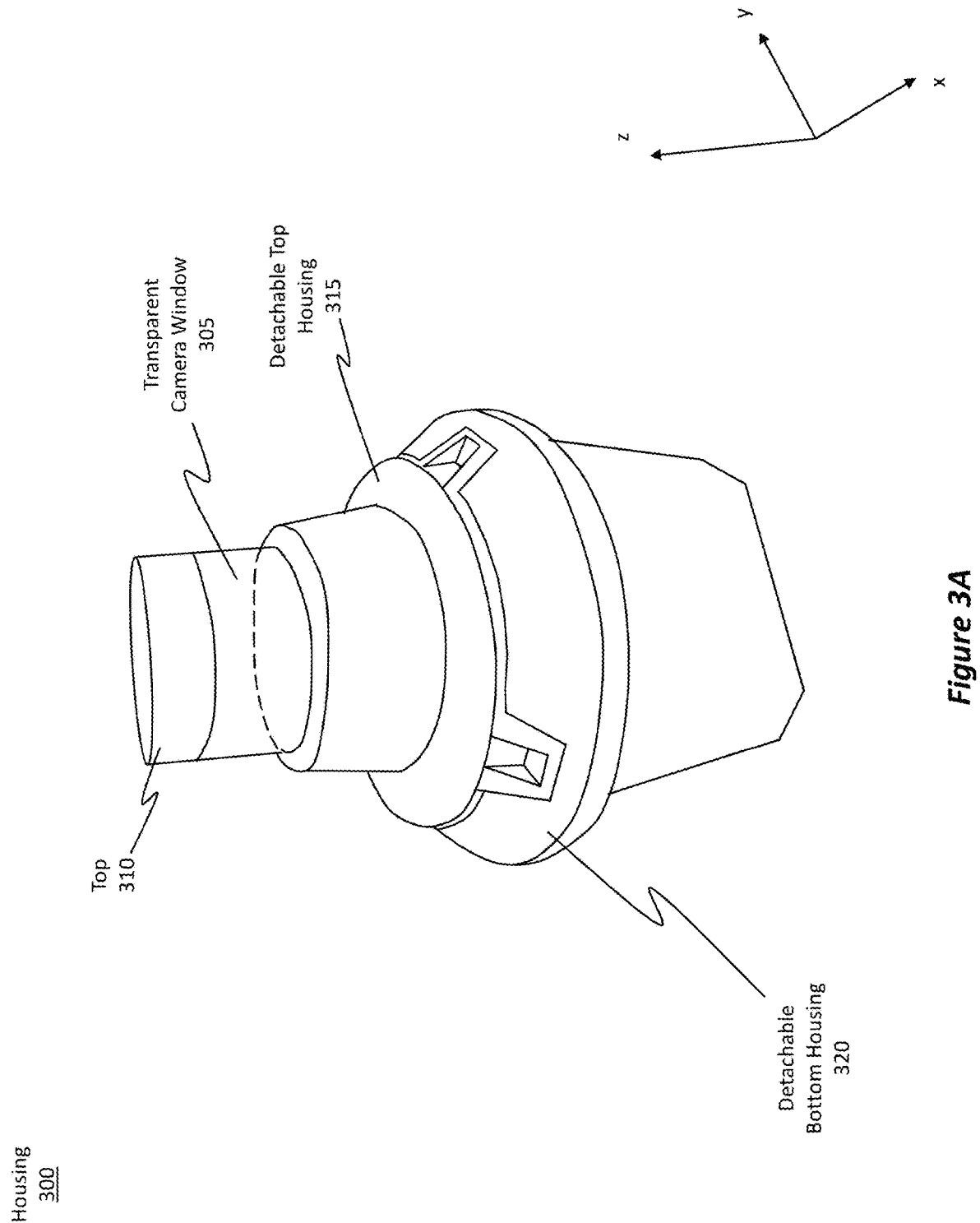
FIG. 3A illustrates a protective housing that may be used to envelope the camera system.

Attention will now be directed to FIG. 3A, which illustrates one type of protective housing 300 that may be used to protect the camera system 200 of FIGS. 2A and 2B. Housing 300 is shown as including a transparent camera window 305 through which the camera 205 of FIGS. 2A and 2B can see through. Housing 300 also includes a top 310 that protects the camera system 200 from overhead dangers.

Housing 300 also includes a detachable top housing 315 and a detachable bottom housing 320. Via these two sections, the housing 300 can effectively be opened up to allow the camera system 200 to be placed inside of the housing 300. Detachable top housing 315 may be physically coupled to detachable bottom housing 320 in any manner, such as, but not limited to, nuts and bolts, screws, latch clasps, balls and sockets, or any other type of connection, without limitation. The x-y-z legend, which corresponds to the same orientation of the x-y-z legend in the earlier figures, shows the physical orientation of housing 300.

FIG. 3B illustrates how the housing 300 can be opened to receive the camera system 200. Once the camera system 200 is disposed within the internal confines of the housing 300, the camera 205 will be located at a position to enable the camera 205 to see through the transparent camera window 305. Together, the combination of the camera system 200 and the housing 300 constitutes a camera unit 325. With this configuration, the camera system 200 will be protected from environmental conditions as well as other potentially destructive events (e.g., vandalism, theft, etc.).

Figure 3C:
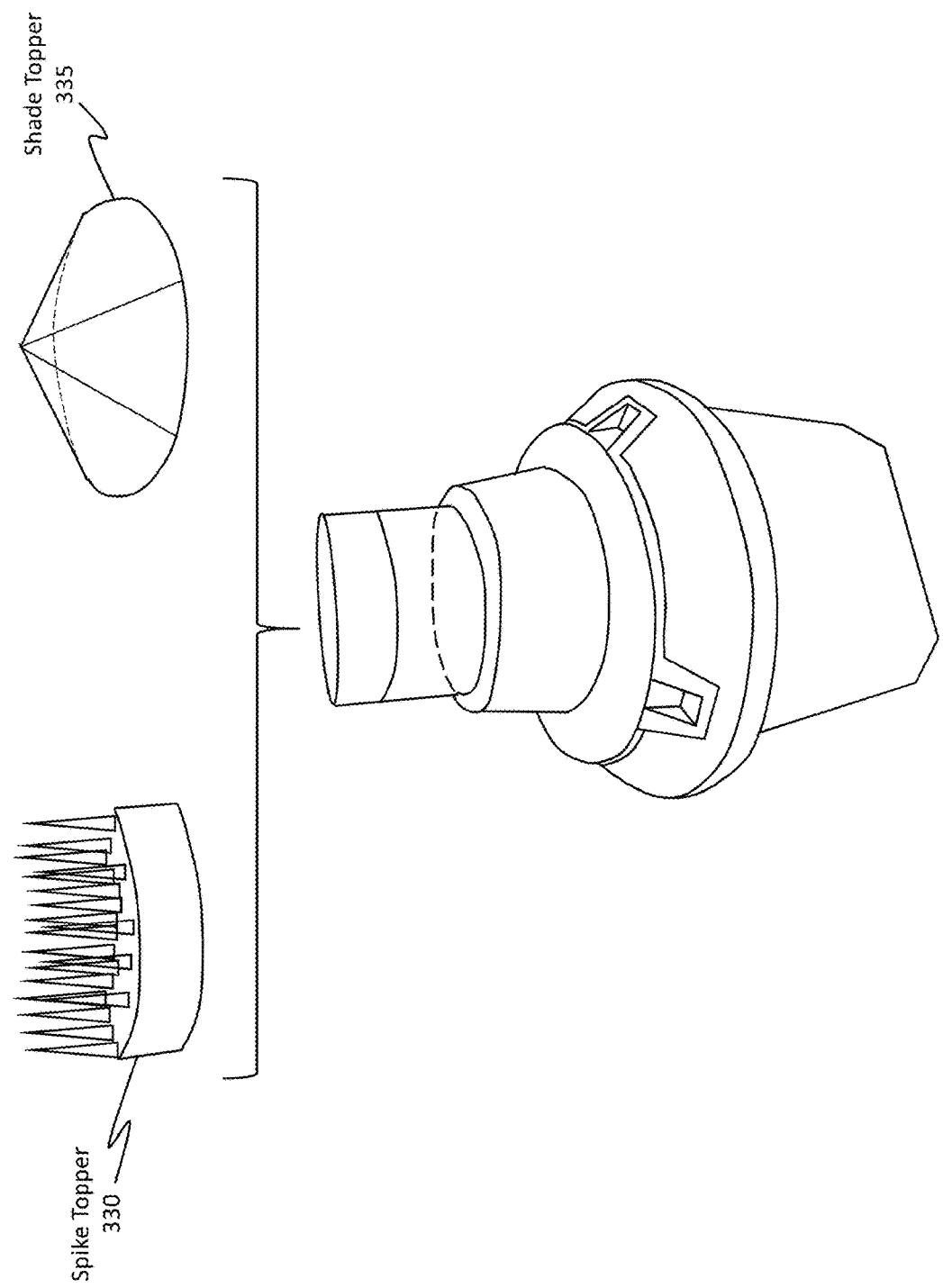
FIG. 3C illustrates some different types of tops that may be used to further protect the camera system.

FIG. 3C illustrates how the top portion (e.g., 310) can be outfitted with different configurations to provide even further protection. For example, to protect the camera unit 325 from birds and other animals, the camera unit 325 may be outfitted with a spike topper 330 that includes any number of pointed spikes to prevent animals from perching on the top of the camera unit 325.

Because the camera unit 325 includes an uncooled thermal imaging sensor, which generates a thermal image by recording heat, the sun may impact the accuracy of the sensor. As a consequence, some embodiments may use a shade topper 335 to shade the camera 205 from the sun. Accordingly, in some embodiments, the rotating camera system additionally includes an external protective housing that fits over a unit comprising an uncooled thermal imaging sensor, an electrically powered rotary actuator, a rotary encoder, and a slip ring.

In some embodiments, the system may filter out the effects of the sun or any other heat source that may impact the temperature readings of the uncooled thermal imaging sensor. For instance, by acquiring an initial baseline reading of the environment, the embodiments can then use this baseline reading to selectively filter subsequent readings in an effort to improve the signal to noise ration (SNR) of the resulting thermal images.

Rotation Characteristics

FIG. 4A illustrates a bird's eye perspective 400 of the camera system described herein. In particular, FIG. 4A shows a camera 405, which may be configured in the manner described in connection with camera 205 of FIGS. 2A and 2B and which may be an uncooled thermal imaging sensor. Here, camera 405 is shown as including an optical axis 410 and a field of view (FOV) 415. Additionally, there is a horizontal rotation axis 420 associated with the camera 405. For instance, with reference to FIGS. 2A and 2B, the horizontal rotation axis 420 corresponds to the axis of rotation of the rotating shaft 215A. The x-y-z legend illustrates how the z-axis may correlate to the horizontal rotation axis 420. That is, the camera 405 may rotate relative to the z-axis. Additionally, it should be noted that the motor 215 of FIGS. 2A and 2B may be configured to rotate in any direction relative to the horizontal rotation axis 420, such that the camera 405 may rotate in a similar manner. By way of example, relative to the horizontal rotation axis 420, the camera 405 may rotate in a counterclockwise direction (e.g., horizontal rotation direction 425A) or a clockwise direction (e.g., horizontal rotation direction 425B).

FIG. 4B illustrates a side profile perspective 430 of the camera 405. Here, the camera 405's optical axis 410 is along the x-axis direction. Similarly, the camera system may have an actuator that enables the camera 405 to have a vertical angular offset relative to the horizontal base 240 described earlier. That is, the camera 405 may have a vertical rotation axis 435 and can rotate vertically, as shown by vertical rotation direction 440. Stated differently, the disclosed uncooled thermal imaging sensors can be further configured to rotate vertically relative to a base of the rotating camera system.

In some embodiments, camera 405 can complete a full 360 vertical rotation. The connecting wires (e.g., wires 210) may restrict the camera 405 from rotating farther than 360 degrees in the vertical direction. In some embodiments, there may be a sufficient amount of buffer or slack in the wires 210 to allow the camera 405 to rotate even beyond 360 degrees. Therefore, in some embodiments, camera 405 can rotate a full 360 degrees in both a horizontal and vertical direction.

In other embodiments, the vertical rotation may be limited. For example, in some implementations, camera 405 may be restricted to rotating only about 340 degrees, 320 degrees, 300 degrees, 280 degrees, 260 degrees, 240 degrees, 220 degrees, 200 degrees, 180 degrees, 160 degrees, 140 degrees, 120 degrees, 100 degrees, 90 degrees, 80 degrees, 70 degrees, 60 degrees, 50 degrees, or perhaps even 45 degrees in the vertical direction. In some embodiments, the amount of vertical rotation is restricted not based on the rotation abilities of the camera 405 but instead is restricted based on the amount of transparent material provided in the transparent camera window 305 from FIG. 3A. As such, the vertical rotation amount may be limited based on the design constraints of the housing 300.

Figure 5A:
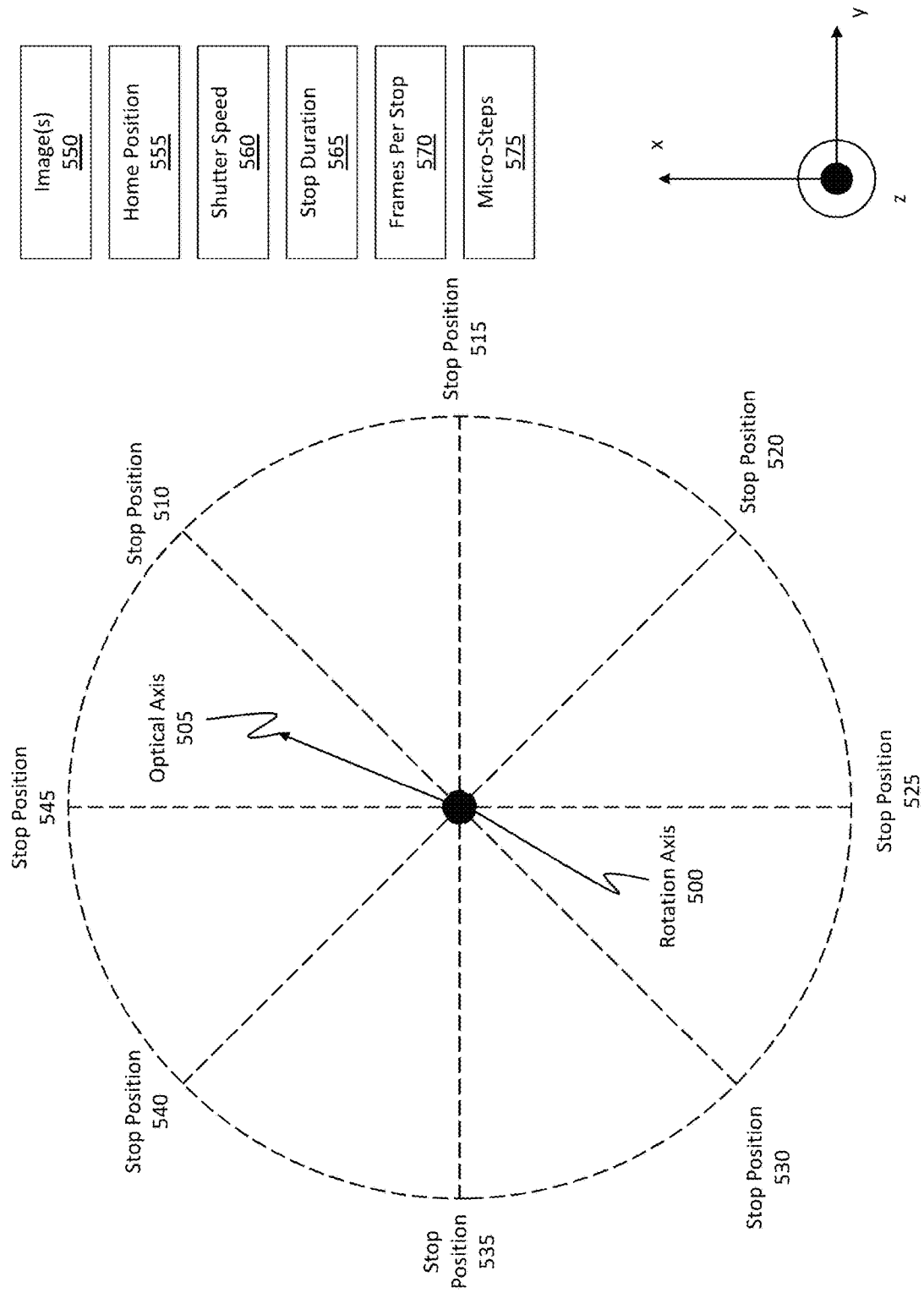
FIG. 5A illustrates how the camera system, when rotating in a horizontal direction, can be configured to stop at any number of different stop positions in order to generate any number of images, including thermal images.

FIG. 5A provides additional detail regarding the horizontal rotation characteristics of the disclosed camera system. In particular, FIG. 5A shows a rotation axis 500, which is representative of the horizontal rotation axis 420 shown in FIG. 4A, and an optical axis 505, which is representative of the optical axis 410. The x-y-z legend illustrates how the rotation axis 500 corresponds to the z-axis direction.

FIG. 5A also shows a number of stop positions, including stop positions 510, 515, 520, 525, 530, 535, 540, and 545. As the camera rotates, it can eventually be stopped at one of the stop positions to enable the camera to generate one or more thermal images at that stop position. Once the thermal images are generated, the camera can be rotated to the next stop position and the process can repeat itself, as rotation from the last stop position, back to the first stop position, occurs. (i.e., the camera may repeatedly rotate through the stop positions).

Although only 8 stop positions are illustrated, one will appreciate that any number of stop positions may be used (e.g., hundreds and potentially thousands). The remaining portion of this disclosure will provide examples based on the 8 stop positions shown in FIG. 5A, but one will appreciate that any other or number of stop positions may be used, without limitation. Eight stop positions is typically sufficient, given the field of view of each stop position, to monitor an entire 360° area around where the camera is positioned.

Additionally, the stop positions can be programmatically set or modified. In some cases, these stop positions can be set automatically without input from a human user. By way of example, the camera system can be placed in an environment and then instructed to perform an initial calibration. By scanning the room across the entire 360-degree range, the embodiments can identify whether any specific view or perspective across the 360-degree range is blocked, impeded, or otherwise identified as not having a sufficiently high priority to place a stop position at that location (e.g., perhaps a low priority back area corner need not be monitored).

For instance, perhaps the camera system is mounted next to a wall such that the back 180-degree section is entirely blocked by the wall. Here, the camera system can determine that there is no need to configure a stop position at the blocked locations. As a consequence, the stop positions may be set only at the unblocked locations (i.e. the front 180 degrees). Accordingly, the system can detect perspectives that are blocked, impeded, or otherwise of a low priority and can dynamically refrain from establishing a stop position at that location.

As the camera rotates, the 5-phase motor can be dynamically/programmatically controlled to temporarily stop at any one of the stop positions 510-545. As described earlier, the 5-phase motor can rotate at a rate up to between 60 RPM and 90 RPM, though slower rates may be used (e.g., 5 RPM, 10 RPM, 15 RPM, 20 RPM, 25 RPM, 30 RPM, 35 RPM, 40 RPM, 45 RPM, 50 RPM, 55 RPM, and so on). Optionally, the rotation rate may be between 30 RMP and 120 RPM. The rotation rate of the 5-phase motor (and thus the camera) can vary and is not required to be constant. For instance, the motor can rotate at a rate of 60 RPM between stop positions 510 and 515, and then the motor can rotate at a rate of 30 RPM between stop positions 515 and 520. Accordingly, in some embodiments, the electrically powered rotary actuator (i.e. the motor) may be structured or configured to rotate the uncooled thermal imaging sensor any amount across the 360-degree range relative to the base of the rotating camera system at a rate between more than 0 RPM (e.g., 01. RPM, 0.2, 0.3, 0.4, 0.5, 0.6, 0.7, 0.8, 0.9, 1.0, etc.) and less than about 90 RPM.

In some embodiments, the motor can skip stop positions (e.g., go directly from stop position 520 to stop position 530 by skipping stop position 525), as will be described in more detail later (e.g., based on certain triggering conditions). Additionally, the acceleration rates of the motor can vary as well (e.g., a first acceleration after stopping at stop position 535 versus a second acceleration after stopping at stop position 540). In this regard, the rotate rates (i.e. velocity) and acceleration rates can vary between stop positions or they can be the same between stop positions. These values can be adjusted programmatically on demand.

When the camera's optical axis 505 arrives at a stop position (as determined by the encoder 230 from FIG. 2A) and the motor stops rotating, then the camera can be triggered to acquire any number of thermal images. If other cameras are disposed on the camera system, then those other cameras can be triggered to acquire image data as well (e.g., visible light data, depth data, etc.). If those other cameras are positioned proximately to the uncooled thermal imaging sensor, then the cameras and the uncooled thermal imaging sensor can capture images of the surrounding environment from substantially the same perspective. Having multiple different types of images from the same perspective is advantageous because it enables different image data to be overlaid on top of each other, as will be described in more detail later. Accordingly, image(s) 550 represents how the uncooled thermal imaging sensor can acquire any number of thermal images and also represents the images from any of the other cameras.

In this regard, the electrically powered rotary actuator may be configured to temporarily stop rotating the rotating shaft when the uncooled thermal imaging sensor's optical axis is aimed at each one of a plurality of different stop positions. When the rotating shaft is temporarily stopped at any one of the plurality of different stop positions, the uncooled thermal imaging sensor can then generate any number of thermal images. Often, the uncooled thermal imaging sensor will generate between 1 and 10 thermal images, though more than 10 can be generated if desired (e.g., perhaps between 1 and 100 images).

Home position 555 illustrates how the disclosed embodiments are able to dynamically establish the home position 555 at any location along the 360-degree rotation axis of the camera system. By way of example and not limitation, any one of the stop positions 510-545 may be programmatically selected to operate as the home position 555. In a first time, stop position 510 may operate as the home position 555. At a second, later time, home position 555 can be updated or modified, and stop position 515 may now be selected to operate as the home position 555. The home position 555 may be used to assist the encoder 230 from FIGS. 2A and 2B in determining the angular position of the camera 205 and the rotating shaft 215A. Additionally, the home position 555 may help with calibrating the positional understanding or data of the encoder 230.

Shutter speed 560 refers to the shutter characteristics of the uncooled thermal imaging sensor described herein. In accordance with at least some of the disclosed embodiments, the shutter speed 560 can vary within the range spanning 3 frames per second (FPS) and 20 FPS (or between 1 FPS and 20 FPS). In some embodiments, the range is between 3 FPS and 10 FPS. In some embodiments, the shutter speed is less than $\frac{1}{9}^{th}$ of a second (i.e. 0.11 seconds). Accordingly, the shutter speed 560 can vary to enable the camera to achieve the FPS rate described above. In some embodiments, the uncooled thermal imaging sensor supports a 9 Hz sensor while in other embodiments the sensor supports a 60 Hz sensor.

Stop duration 565 refers to the amount of time the camera is held at any one stop position (e.g., stop positions 510-545). Of course, the stop duration of one stop position can be the same or can be different from the stop duration of another stop position. In some embodiments, the stop duration 565 can vary within the range spanning 0.05 seconds (i.e. $\frac{1}{20}^{th}$ of a second, corresponding to the 20 FPS shutter speed rate described earlier) up to multiple seconds (e.g., 1 second, 2, 3, 4, 5, 6, 7, 8, 9, 10, or more than 10 seconds). The stop duration 565 can be tied, or rather is dependent on, the shutter speed 560. It is beneficial for the uncooled thermal imaging sensor to remain stationary while generating its thermal image to prevent skewing in the resulting thermal image. As such, the stop duration 565 can be dynamically adjusted to ensure the shutter of the uncooled thermal imaging sensor is provided enough time to obtain sufficient and accurate thermal data.

Frames per stop 570 refers to the number of thermal images the uncooled thermal imaging sensor (and/or the other camera devices) acquires when stopped at a particular stop position. Similar to the earlier discussion, frames per stop 570 can vary between stop positions or it can be a constant value. By way of example, the camera may acquire 5 frames (i.e. thermal images) for each one of the stop positions 510-545. In other scenarios, the camera may acquire 5 frames for stop position 510, 6 frames for stop position 515, 1 frame for stop position 520, and so on. Accordingly, frames per stop 570 can be set to any value. Typical values for the frames per stop 570 vary within the range spanning 1 frame per stop up to 10 frames per stop, though more than 10 frames may be acquired.

Micro-steps 575 refers to the ability of the camera system's 5-phase motor to rotate in micro-increments. That is, as described earlier, using a 5-phase motor enables the disclosed camera system to rotate in micro-step increments. By enabling such small discrete steps, the camera system can utilize an increased number of stop positions and can thus obtain increased thermal images of the surrounding environment. In some embodiments, the step of the actuator can be as little as 0.0001 of a rotational distance (i.e. $\frac{1}{10,000}^{th}$ of a rotation).

Figure 5B:
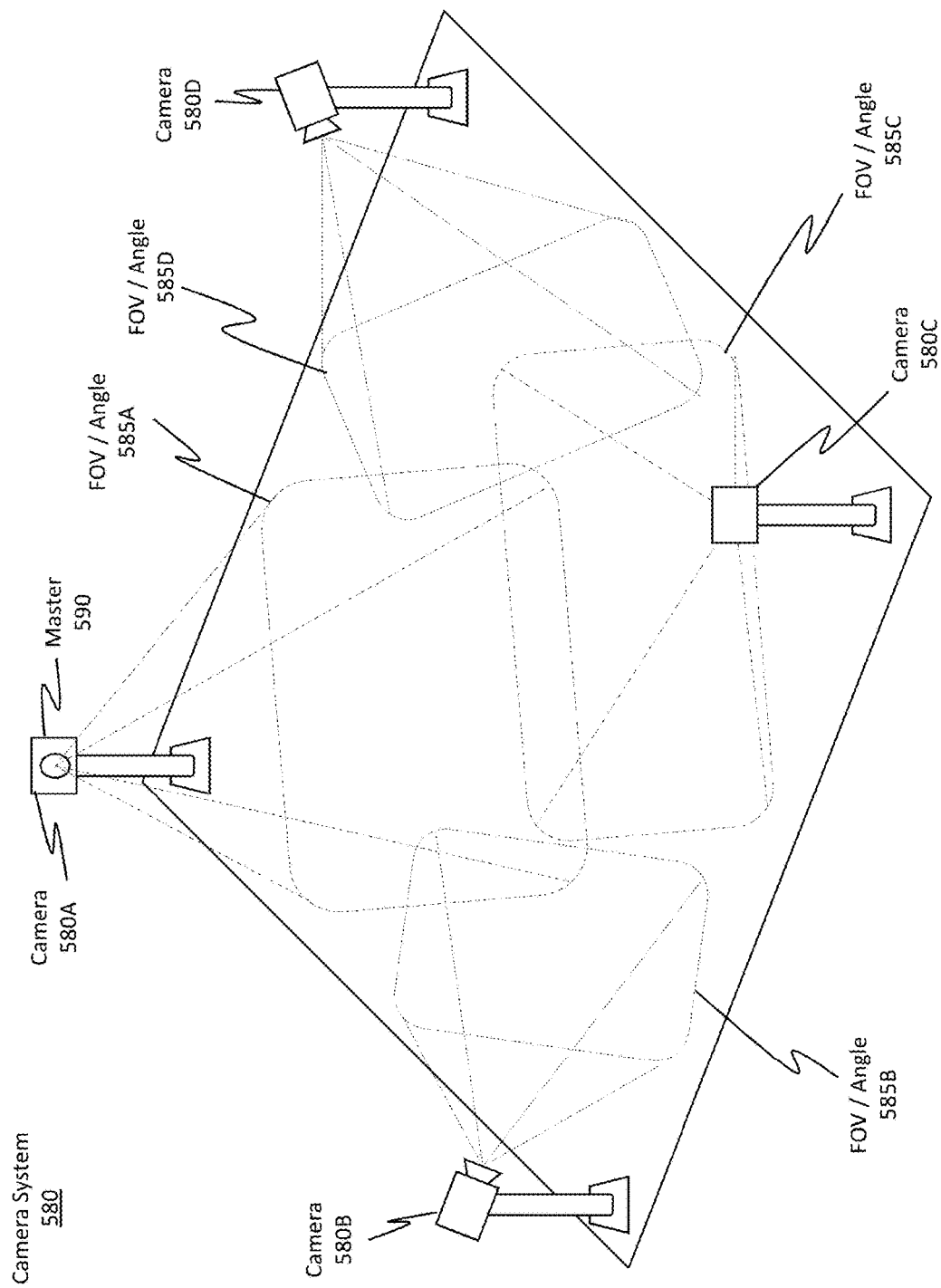
FIG. 5B illustrates how a group of one or more different cameras can operate as a system to acquire thermal image data for an environment.

While the above disclosure focused on scenarios in which a single uncooled thermal imaging sensor was being used to acquire thermal images, it should be noted that the camera system may include a plurality of uncooled thermal imaging sensors that operate in unison, or rather as a system, to acquire thermal images. By way of example, FIG. 5B shows a camera system 580 that includes multiple cameras, including cameras 580A, 580B, 580C, and 580D. Each of these cameras may be configured in the manner described with respect to the earlier figures. Furthermore, although only 4 cameras are illustrated, it will be appreciated that any number of cameras may be included in camera system 580 (e.g., 5 cameras, 6, cameras, 7 cameras, 8 cameras, 9 cameras, 10 cameras, 20, 30, 40, 50, 60, 70, 80, 90, 100, or more than 100 cameras).

Each of cameras 580A-580D may be configured to rotate in the manner described earlier. Additionally, or alternatively, each of the cameras 580A-580D may be configured to remain stationary (i.e. no rotation) and instead simply capture a different angle or perspective of the surrounding environment. In situations where the different cameras' FOVs overlap, then the combination of the resulting thermal images will provide a comprehensive view of the surrounding environment. It should be noted, however, that cameras 580A-580D can rotate and also provide overlapping FOVs.

FIG. 5B specifically shows how camera 580A has a FOV/angle 585A; camera 580B has a FOV/angle 585B; camera 580C has a FOV/angle 585C; and camera 580D has a FOV/angle 585D. FOV/angle 585A is shown as at least partially overlapping FOV/angle 585B and 585D. Similarly, FOV/angle 585C is shown as at least partially overlapping FOV/angle 585A and 585D. Accordingly, the positioning of the cameras in the camera system 580 may be set so that at least a part of their corresponding FOVs may overlap one with another. Stated differently, some embodiments include one or more uncooled thermal imaging sensors that are positioned at a particular angle or stop position in order to acquire one or more thermal images of the surrounding environment.

Image Compilation

After (or perhaps even during) any number of thermal images and other types of images are generated and/or acquired, some of the disclosed embodiments are able to compile these images into different encoded layouts and transmit them to an external computer system for additional processing by a VMS of that external system. FIG. 6A shows one example illustration representative of this process. It will be appreciated, however, that FIG. 6A is being provided for example purposes only and should not be considered limiting or otherwise binding. The embodiments are able to control the layout of the images by encoding the images in any number of video streams (e.g., 1 video stream, 2, 3, 4, 5, or more than 5).

FIG. 6A shows an image compilation 600 (comprising a multi-degree field of view). Here, image compilation 600 is formed from any number of discrete images. By way of example, these images may include stop position image 605A, stop position image 605B, stop position image 605C, stop position image 605D, stop position image 605E, stop position image 605F, stop position image 605G, and stop position image 605H. With reference to FIG. 5A, stop position image 605A may be an image acquired while the camera's optical axis 505 is positioned at stop position 510. Similarly, stop position image 605B may be an image acquired while the camera's optical axis 505 is positioned at stop position 515, and so on and so forth. In other embodiments, multiple ones of the stop position images 605A-605H may have been taken from the same stop position (i.e. multiple images capture the same perspective view).

In some embodiments, the different stop position images 605A-605H may be combined, merged, stitched, or otherwise fused together to form a so-called panoramic image 610. Suppose, by way of example, that stop position images 605A-605H were collected along the 360-degree traversal path of the camera as shown in FIG. 5A. If that were the case, then the stop position images 605A-605H would capture the 360-degree surrounding area of the camera. By merging these images together, the panoramic image 610 can provide a single image that represents the 360-degree surrounding area of the camera. In this regard, any number of stop position images can be stitched together to form a single panoramic image.

The process of stitching the different images can vary. In some cases, the stitching process can be performed by identifying similar content between two images and then aligning those two images together based on the similar content. Once aligned, then the similar content from one image can be merged with the similar content of the other image. In some cases, instead of merging the similar content, the similar content from one image can simply be removed and then the two images can be merged without having duplicate data. Any technique may be used to merge images having similar content.

In some cases, the image compilation 600, which may include any number of discrete stop position images and/or any number of panoramic images, can be included in one or more video streams, such as video stream 615. That is, in some cases, a single video stream comprising any number of stop position images and/or panoramic images may be transmitted to an external computer while in other cases multiple video streams comprising one or more stop position images and/or one or more panoramic images may be transmitted to the external computer. In some cases, the video stream 615 may be sent to multiple external computers. Selecting how many video streams to be transmitted may depend on a service level agreement (SLA), bandwidth limit, or any other constraint.

Figure 6B:
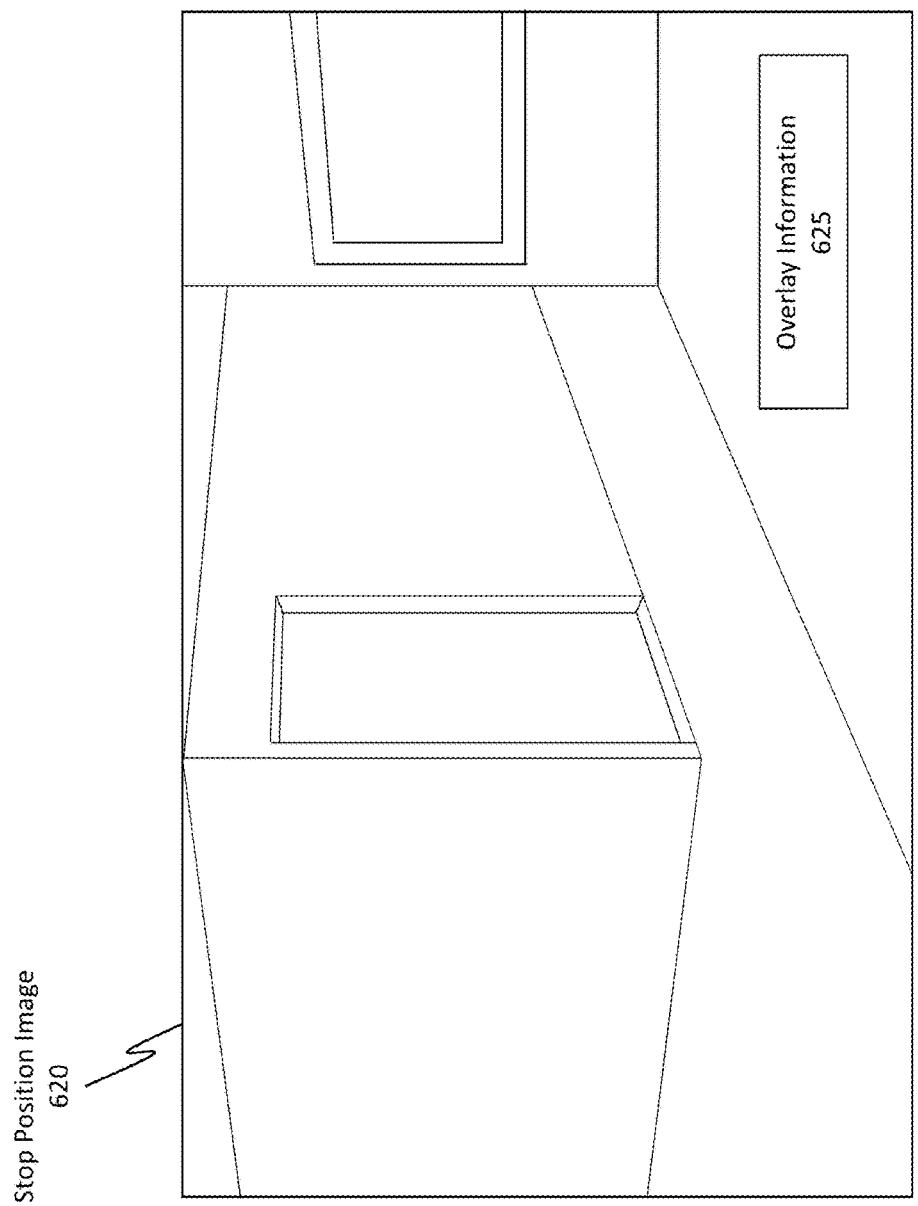

As described earlier, when multiple different types of cameras are used to acquire image data of an environment, some information from one type of image may be exported, migrated, or otherwise included within another type of image. By way of example, FIG. 6B shows a stop position image 620, which may be one of the stop position images 605A-605H in FIG. 6A and which may be a thermal image. Suppose, by way of example, that a visible light camera and a depth camera were disposed in a proximate position to the uncooled thermal image sensor used to generate the stop position image 620. Because of the proximity, the three different cameras capture image data of the environment from essentially the same perspective. As a result, some or all of the information from the visible light image, the depth image (or depth data), and the thermal image can be overlaid on top of each other. Specifically, FIG. 6B shows how overlay information 625 can be overlaid on top of the stop position image 620.

An example will be helpful. Suppose stop position image 620 is a thermal image depicting thermal data of an environment. Suppose also a depth camera captured depth data for the different objects located in the environment. Further suppose a visible light camera captured a visible light image of the environment. In accordance the disclosed principles, the embodiments can analyze the visible light image to perform semantic segmentation (i.e. object detection) using any type of machine learning. The other images, including the depth image and the thermal image, can also be analyzed via machine learning to detect any type of object or event (to be described in more detail later).

As used herein, "machine learning" may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically identify objects within an environment.

Based on the results of the machine learning processes, the objects in the environment may be classified into different object classes or classifications. With reference to FIG. 6B, the machine learning may identify a door, a wall, a floor, and a picture hanging on the wall.

Additionally, based on the depth data obtained by the depth camera, the depths of the door, wall, floor, and picture can all be determined. Furthermore, based on the thermal data obtained by the uncooled thermal imaging sensor, the thermal characteristics of the environment can be determined.

Supposing stop position image 620 is a thermal image, the depth data and the semantic segmentation data can be overlaid over one or more portions of the stop position image 620, as shown by overlay information 625. For example, in the thermal image, the door's depth and semantic segmentation classification can be overlaid on the stop position image 620 at a location proximate to the door. Similarly, in the thermal image, the picture's depth and semantic segmentation classification can be overlaid on the stop position image 620 at a location proximate to the picture. In this regard, information from one type of image can initially be pulled or extracted. Then, this information can be analyzed to identify a corresponding feature, object, or occurring event in another image. The information can then be aligned with the other image and then displayed at a location proximate to the object. As such, information from any number of images can be merged together to provide additional information. Examples of some other information that may be merged include, but is not limited to, global positioning system (GPS) data, climate data (e.g., temperature, humidity, etc.), elevation, object recognition data, event recognition data, and so forth.

Figure 6C:
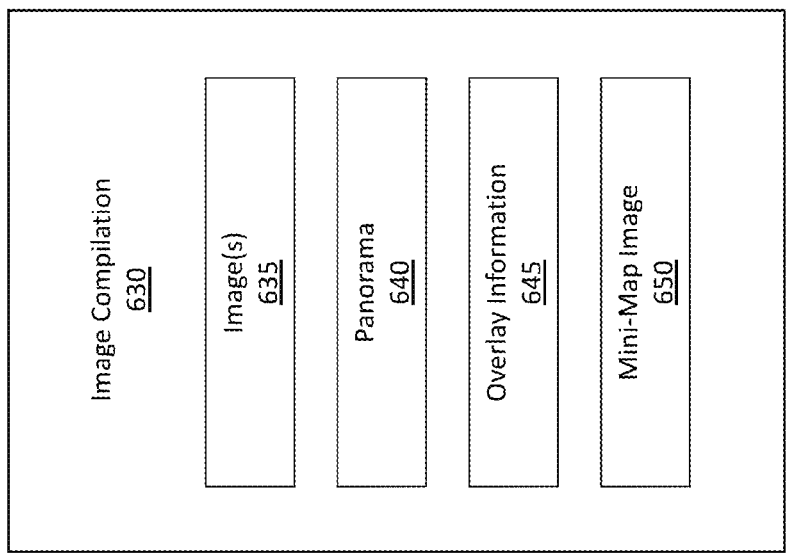

FIG. 6C illustrates a summary view of some of the information that may be included in an image compilation 630, which is representative of the image compilation 600 from FIG. 6A. Specifically, image compilation 630 may include any number of image(s) 635, panorama(s) 640, overlay information 645, and even a mini-map image 650. As used herein, a mini-map image 650 may be a representation of a particular environment as viewed from a bird's eye perspective. That is, a skeletal depiction of the environment (e.g., walls, doors, tables, objects, and so forth) may be provided within a miniaturized illustration to describe the environment from an elevated view. The mini-map image 650 may, in some cases, be included in the overlay information 645 such that the mini-map image 650 may be overlaid on top of another image. The mini-map 650 can also geospatially display any alerts provided by one or more of the cameras (e.g., the mini-map 650 can display an icon at a specific location corresponding to where an object or event is occurring, which object or event caused the alert to be raised).

In some cases, the overlay information 645, including potentially the mini-map image 650, may be semi-transparent. That is, when the overlay information 645 is overlaid on top of a particular image, the overlay information 645 may be at least partially see-through such that the underlying image may be at least partially visible. Of course, the degree or extent of the transparency can be set to any value, without limitation. In other embodiments, the overlay information 645 is not transparent but rather is entirely opaque.

In some embodiments, the overlay information 645 may be emphasized in some manner, such as by highlights, borders, bolded emphasis, coloring, or perhaps even flashing or blinking. In some embodiments, the overlay information 645 may be displayed only when a triggering condition occurs (e.g., user input or detection of a specific object or event). In some embodiments, the overlay information 645 may appear for a determined period of time and then disappear for a period of time, with the cycle repeating itself.

In some cases, specific images corresponding to specific stop positions may be determined to have a higher priority than other images. By way of example, a particular event or object of interest may be detected in one or more images while another set of one or more images may not have any objects or events of interest. The images having the objects or events of interest may be assigned a priority level that is relatively higher than a priority level assigned to the other images. In some cases, images having higher priorities may be displayed in a more prominent area of a display screen or may be assigned metadata to cause those images to subsequently be displayed in a prominent region. An example of a prominent region may be the center of a computer display. Additionally, or alternatively, those images may be displayed in a pronounced manner (e.g., enlarged or perhaps bolded or emphasized in some manner). The metadata for the images' positions can be included in the data stream.

Multi-Camera Configuration

As described earlier, some embodiments include multiple cameras (e.g., uncooled thermal imaging sensors, visible light cameras, depth cameras, etc.) in the camera system. FIG. 7 shows one such example.

Specifically, FIG. 7 shows a multi-camera system 700 comprising a first camera 705, a second camera 710, and a housing 715. In this particular embodiment, there is only a single housing 715 protecting both the first camera 705 and the second camera 710. In some embodiments, each camera may have its own independent housing. Cameras 705 and 710 may be configured as uncooled thermal imaging sensors, visible light cameras, depth cameras, and/or some combination of the above.

FIG. 7 shows how camera 705 has a FOV 720 and how camera 710 has a FOV 725. In some embodiments, FOV 720 and 725 may be aligned with one another such that they substantially overlap in their entirety, perhaps continuously throughout entire rotation cycles. In other embodiments, FOV 720 and 725 may only partially overlap (e.g., a determined percentage, such as 90%, 80%, 70%, 60%, 50%, 40%, 30%, 20%, 10%, or less than 10%). In yet some other embodiments, FOV 720 and 725 may not overlap at all such that camera 705 is pointed in one direction or angle and camera 710 is pointed in an entirely different direction or angle.

If cameras 705 and 710 are structured to rotate, as described earlier, then their rotation rates, stop durations, and frame acquiring rates may by synchronized with one another. Alternatively, their rotation rates, stop durations, and frame acquiring rates may be asynchronous with one another. By way of example, camera 705 may rotate at a rate that is faster than the rotation rate of camera 710. In some cases, camera 705 may rotate 1.1×, 1.2×, 1.3×, 1.4×, 1.5×, 2.0×, 2.5×, 3.0×, 3.5×, 4.0×, 4.5×, 5.0×, 6.0×, 7.0×, 8.0×, 9.0×, 10.0× or more than 10 times faster than the rotation rate of camera 710.

In some embodiments, camera 705 may be configured to acquire 2×, 3×, 4×, 5×, 6×, or more than 6× the number of images as the number of images acquired by the camera 710. Similarly, camera 705 may be configured to stop at a stop position for longer or shorter than the amount of time camera 710 stops at a stop position. For instance, the stop duration of camera 705 may be 1.1×, 1.2×, 1.3×, 1.4×, 1.5×, 2.0×, 2.5×, 3.0×, 3.5×, 4.0×, 4.5×, 5.0×, 6.0×, 7.0×, 8.0×, 9.0×, 10.0× or more than 10 times more (or less) than the stop duration of camera 710.

Additionally, the characteristics of the stop positions for camera 705 may be different than the characteristics of the stop positions for camera 710. In some cases, camera 705 may have 8 stop positions (e.g., as shown in FIG. 5A) while camera 710 may have a different number of stop positions (e.g., 2, 3, 4, 5, 6, 7, 9, 10, 11, 12, 13, 14, 15, 16, or more than 17).

In some cases, even the rotation direction(s) 730 may be different or may be the same as between camera 705 and 710. For instance, camera 705 may rotate in a clockwise direction while camera 710 may rotate in a counterclockwise direction. Sometimes, camera 705 may periodically change its rotation direction (e.g., change from rotating in a clockwise direction to rotating in a counterclockwise direction and then back to a clockwise direction) while camera 710 may always rotate in the same direction, without change.

Synchronous rotation 735, therefore, represents the ability of the cameras 705 and 710 to rotate in a synchronous manner while asynchronous rotation 740 represents the ability of the cameras 705 and 710 to rotate in an asynchronous manner.

Triggering condition(s) 745 represent how the cameras 705 and 710 may be triggered to acquire image data based on different triggering conditions or criteria. Additionally, triggering condition(s) 745 may represent when the acquired images and data are streamed to another device. As such, triggering condition(s) 745 is not simply limited to determining when a camera is to acquire image data, but it may also include determining when to transmit or stream some or all of the acquired image data to another device.

Some examples of triggering conditions that may be included among triggering condition(s) 745 will be helpful. In some implementations, cameras 705 and 710 (hereinafter only camera 705 will be referenced for brevity purposes) may be triggered to acquire image data each time the camera's optical axis arrives at a particular stop position (i.e.

when the motor stops rotating the camera upon reaching or arriving at a particular stop position).

Another triggering condition may be based on past historical data 750. For instance, historical data 750 may be used to track or identify trends, behaviors, characteristics, or events that occur within an environment. Additional detail will be provided on this aspect later. That said, however, if it is determined that activity rarely occurs relative to a particular stop location, then the camera 705 may elect to skip acquiring image data from that stop position for a determined period of time or a determine number of rotations. Once the determined period of time elapses (e.g., a set number of seconds, minutes, hours, or perhaps even days), then the camera may be triggered to acquire a new image from that stop position. Similarly, once the camera has rotated a determined number of rotations without stopping at that particular stop position, then the camera may be triggered to stop at that stop position and acquire a new image.

Another triggering condition may relate to when an acquired image (or compilation of images) is streamed to another device. That is, just because the camera 705 generates an image does not necessarily mean that the image will be processed or streamed to another device. In some cases, the camera 705 may immediately discard the image after acquiring it, or the camera 705 may retain the image in a cache or buffer. Once the cache or buffer is full, then the cache or buffer can be emptied and the image discarded if those images are considered to not portray important information (e.g., objects or events). In some embodiments, a ring buffer may be used to continuously add and remove images from the buffer.

Additionally, to determine whether the generated images are to be streamed to another device, the camera system may rely on one or more triggering conditions. One example of a triggering condition may be the detection of a particular object identified within the image and/or detection of a particular event identified within the image. Further details on these aspects will be provided later, but by way of a brief example, the camera system may be triggered to stream (e.g., data stream 140 in FIG. 1A) the image upon detecting a gun on a person (e.g., object detection) or upon detecting a fire in a building (e.g., event detection). In some cases, in addition to transmitting the images, the embodiments may also raise an alert, as illustrated by alert 145 in FIG. 1A. Here, alert 145 may be transmitted to a device 135 of a user who may assist with responding to the object or event. In some cases, alert 145 may simply be recorded in a log for later review during an auditing process (thereby providing a breadcrumb trail related to the object or event).

In some cases, triggering condition(s) 745 may include detection of an environmental condition (e.g., a road blockage, accident, temperature peak or dip, and so on), which may then cause the images to be streamed. Accordingly, any number or type of triggering condition may be included among triggering condition(s) 745. In some cases, the images may always be streamed without regard to a particular triggering condition.

Example Method for Operating a Camera System

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
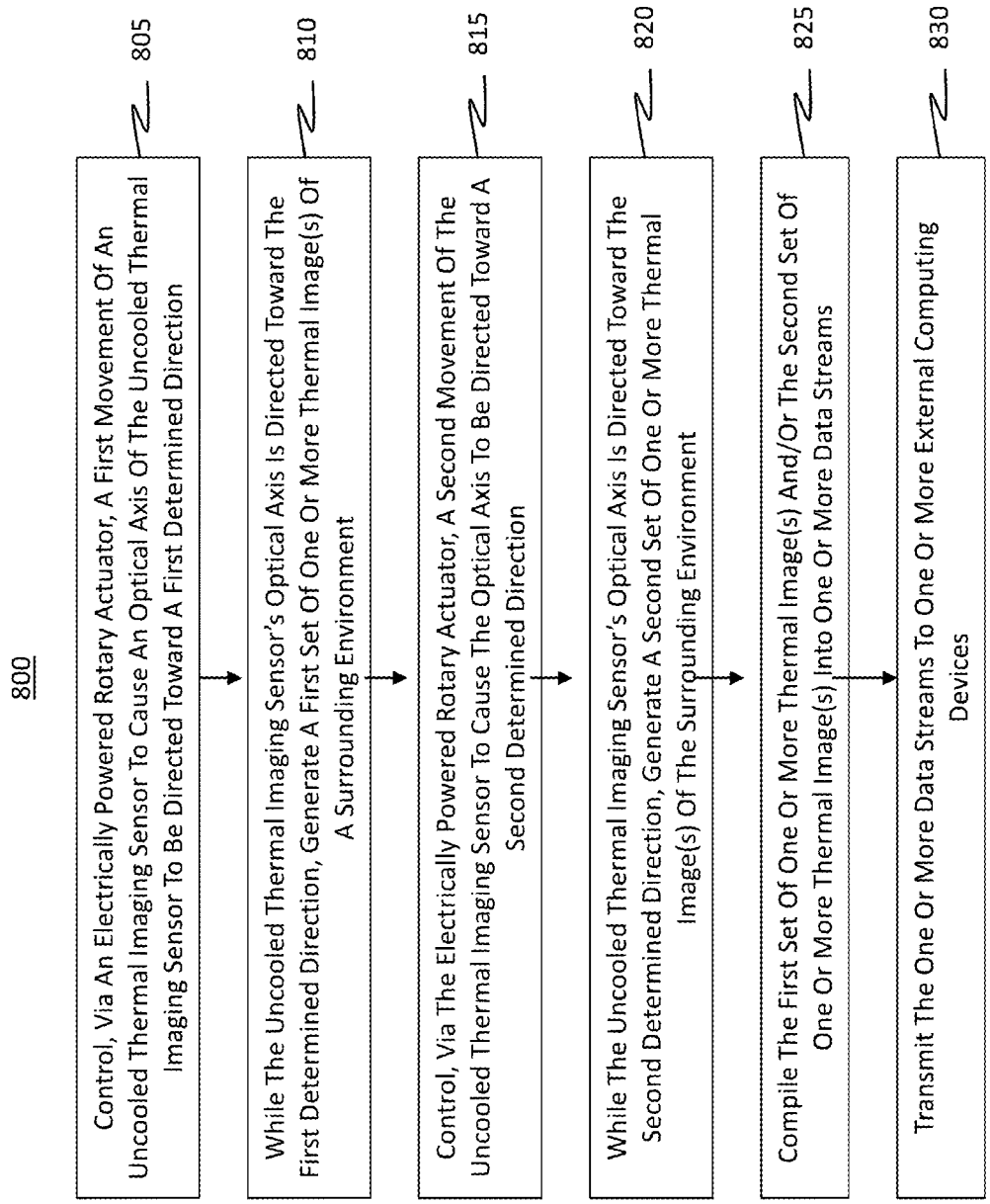
FIG. 8 illustrates a flowchart of an example method for operating the disclosed camera system.

FIG. 8 illustrates a flowchart of an example method 800 for operating the camera system described herein. In particular, method 800 may be performed by a camera system comprising an uncooled thermal imaging sensor and an electrically powered rotary actuator physically coupled to the uncooled thermal imaging sensor. Here, the electrically powered rotary actuator includes a rotating shaft that is physically coupled to the uncooled thermal imaging sensor and that enables the uncooled thermal imaging sensor to rotate with the rotating shaft. The rotating shaft includes a hollowed central portion through which an electrical connection of the uncooled thermal imaging sensor passes through such that the electrical connection rotates with the uncooled thermal imaging sensor and the rotating shaft. This camera system also includes one or more processor(s) and one or more computer-readable hardware storage device(s) having stored thereon computer-executable instructions that are executable by the processor(s) to cause the camera system to perform the method acts of method 800.

Initially, method 800 includes an act (act 805) of controlling, via the electrically powered rotary actuator, a first movement of the uncooled thermal imaging sensor. This first movement causes an optical axis of the uncooled thermal imaging sensor to be directed toward a first determined direction. With reference to FIG. 5A, the movement may cause the uncooled thermal imaging sensor to be positioned or directed toward any one of the stop positions 510-545.

While the uncooled thermal imaging sensor's optical axis is directed toward the first determined direction, there is then an act (act 810) of generating a first set of one or more thermal image(s) of a surrounding environment. For example, while the camera is positioned at stop position 510 in FIG. 5A, the camera may generate any number of image(s) 550.

Method 800 also includes an act (act 815) of controlling, via the electrically powered rotary actuator, a second movement of the uncooled thermal imaging sensor to cause the optical axis to be directed toward a second determined direction. With reference again to FIG. 5A, the camera may be rotated to stop position 515, or perhaps to stop positions 545, 540, 535, 530, 525, or 520 in any particular order. As one example, the rotary actuator may first position the uncooled thermal imaging sensor at stop position 510, then stop positions 535, 545, 540, 515, 530, 525, and finally 520. Of course, any other may be followed, perhaps depending on an assigned priority provided to the different stop positions. In some cases, the ordering may be stop positions 510, 515, 510, 520, 510, 525, 510, and so on because stop position 510 may need to have numerous images acquired.

Returning to FIG. 8, while the uncooled thermal imaging sensor's optical axis is directed toward the second determined direction, there is an act (act 820) of generating a second set of one or more thermal image(s) of the surrounding environment. For instance, while at stop position 515, the camera can again acquire any number of images, including thermal images, visible light images, and depth images.

Method 800 also includes an act (act 825) of compiling (e.g., as described earlier in connection with FIGS. 6A-6C) the first set of one or more thermal image(s) into a data stream. In some cases, the second set of one or more thermal image(s) can also be included in the data stream. Alternatively, the second set may be included in its own data stream. In this regard, the camera system may transmit any number of data streams, with each stream comprising a compilation of one or more other thermal image(s), other types of images, or panorama images.

Then, method 800 includes an act (act 830) of transmitting the one or more data stream(s) to one or more external computing device(s). In some cases, one of the external computing devices may be a master camera system that then transmits the stream to another system, such as a cloud computing device or service. In yet other cases, the external computing device may be a network server or perhaps even a mobile device (e.g., a user, such as a home or business owner, may receive the stream in order to watch what is occurring on his/her property). Based on either the fist set of thermal image(s) and/or the second set of thermal image(s), the camera system can additionally detect an object or an event in the surrounding environment, as will be described in more detail later.

Of course, method 800 can continue my causing the uncooled thermal imaging sensor to be rotated to a new stop position. For instance, the camera system can control, via the rotary actuator, a third movement of the uncooled thermal imaging sensor to cause the optical axis to rotate to a new position, potentially even to a determined home position, as described earlier. Any number of images can be acquired at any number of different stop positions. This process may continue indefinitely without limitation.

Example Method for Controlling Multiple Camera Systems

Figure 9:
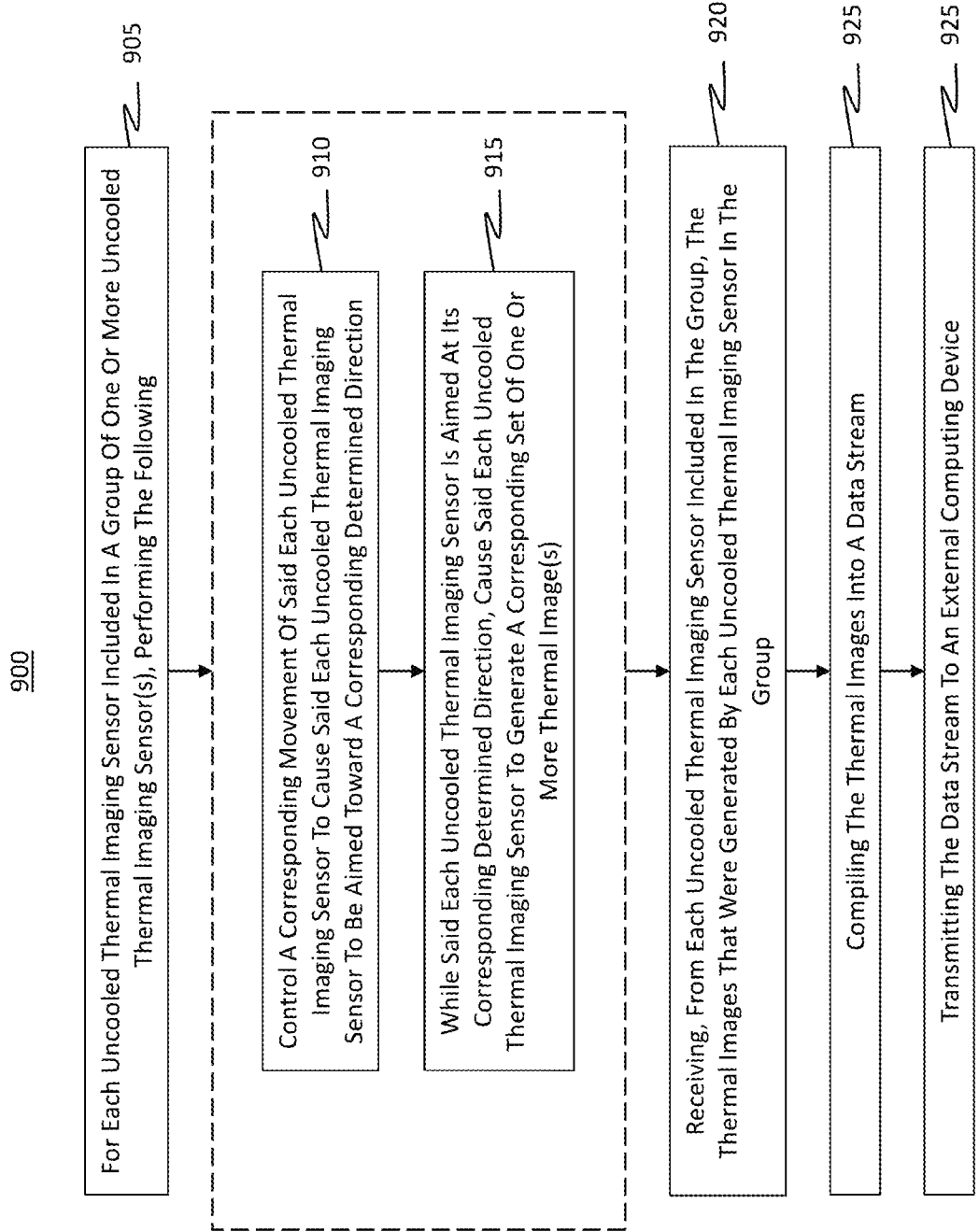
FIG. 9 illustrates a flowchart of an example method for operating a group of one or more different cameras included within a camera system.

FIG. 9 illustrates a flowchart of an example method 900 for generating thermal image data and for transmitting the thermal image data to any number of external computing devices. Here, however, method 900 may be performed by a single uncooled thermal imaging sensor, or, alternatively, it may be performed by a combination or group of multiple uncooled thermal imaging sensors.

Initially, for each uncooled thermal imaging sensor included in a group of one or more uncooled thermal imaging sensor(s), method 900 includes performing (act 905) the two acts/operations listed in the dotted box shown in FIG. 9. Method 900 may be performed by a camera system (e.g., camera system 200 of FIG. 2A) having a single uncooled thermal imaging sensor, or it may be performed by a group of uncooled thermal imaging sensors, as shown in FIG. 5B.

One act (act 910) includes controlling a corresponding movement of each one of the uncooled thermal imaging sensors to cause each one of the uncooled thermal imaging sensors to be aimed toward a corresponding determined direction. For instance, in FIG. 5B, each one of the cameras 580A-580D may be independently controlled and aimed at a particular location, aiming angle, or FOV. In some cases, the cameras may already be aimed at the desired location such that no movement occurs. Instead, only a verification that the cameras are at the desired location can be performed (e.g., by querying the encoder 230 from FIG. 2A or perhaps by acquiring an image and analyzing the content of the image to determine position).

While each one of the uncooled thermal imaging sensors is aimed at its corresponding determined direction, there is an act (act 915) of causing each one of the uncooled thermal imaging sensors to generate a corresponding set of one or more thermal image(s). In some cases, all of the uncooled thermal imaging sensors may operate in a synchronous manner such that all of their thermal images may have substantially the same timestamp (which can be overlaid on the resulting images). In other cases, the uncooled thermal imaging sensors may operate asynchronously. In this regard, a first thermal imaging sensor may be configured to acquire some of the thermal images while a second thermal imaging sensor may be configured to acquire some others of the thermal images. Consequently, the first set of one or more thermal image(s) can, in some cases, be generated by at least two different thermal imaging sensors.

Additionally, method 900 includes an act (act 920) of receiving, from each uncooled thermal imaging sensor included in the group, the thermal images that were generated by each uncooled thermal imaging sensor in the group. In some cases, method 900 may be performed by a master camera such that the master camera receives all of the images. In other cases, method 900 may be performed by a central server or cloud service.

Then, the thermal images are compiled (act 925) into a data stream (e.g., perhaps by the master camera, the central server, or the cloud service). That data stream can then be transmitted (act 925) to any number of external computing devices via any number of data streams. Each stream may be encoded to have a particular image layout or configuration, with metadata describing the layout.

In some cases, the data stream further includes one or more visible light image(s) and one or more depth image(s). Consequently, the data stream can include thermal data from the thermal images, visible light data from the one or more visible light image(s), and depth data from the one or more depth image(s). As described earlier, any amount of type of data can be overlaid on top of the different images.

As briefly introduced above, in some implementations, method 900 is performed by a master uncooled thermal imaging sensor. This master sensor can be configured to control other uncooled thermal imaging sensors in the group. With reference to FIG. 5B, camera 580A is also listed as a master 590. Master 590 may be configured to communicate with the other cameras to obtain and process their image data prior to sending a combination or stream of the image data to another device. Of course, the different cameras can communicate with one another in any manner, including a wired and/or wireless interface. Alternatively, method 900 may be performed by a cloud service operating in a cloud computing environment. For instance, cloud service 130A in FIG. 1A may be configured to perform method 900.

Example Use-Case Scenarios

Figure 10:
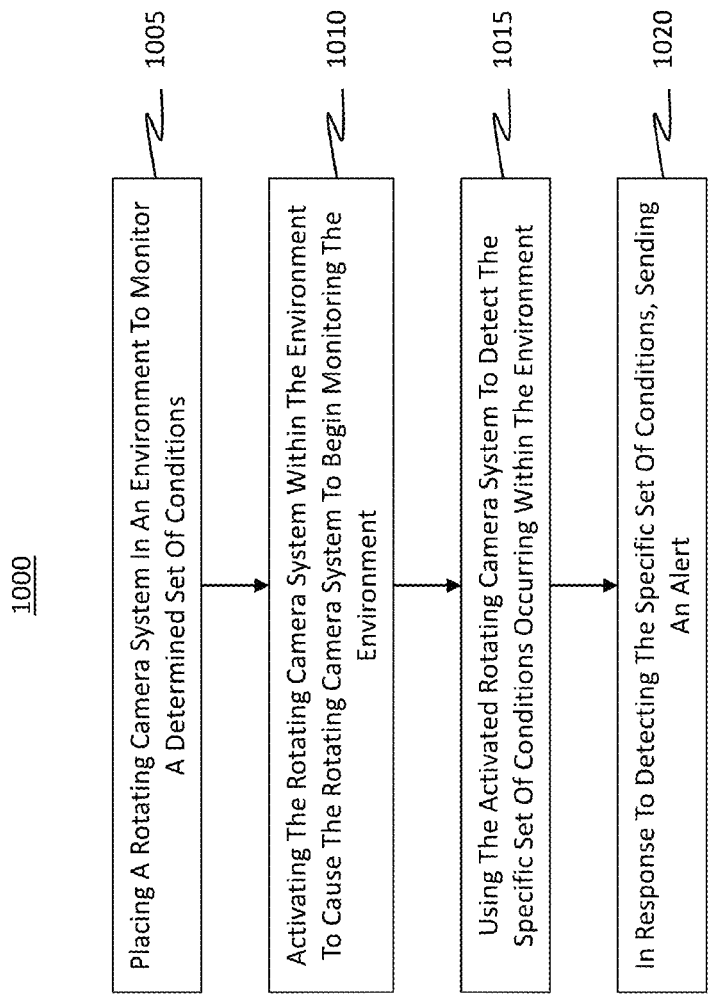
FIG. 10 illustrates a flowchart of an example method for using the disclosed camera system in any number of specific use-case scenarios.

FIG. 10 illustrates a flowchart of an example method 1000 for generating thermal image data in one or more specific use case scenarios. The specific use case scenarios are described in more detail with respect to FIGS. 11-17. FIG. 10, on the other hand, simply references the scenarios in a generalized manner.

Initially, method 1000 includes an act (act 1005) of placing a rotating camera system in an environment to monitor a determined set of conditions. Here, this rotating camera system is configured in the manner described earlier.

Once the rotating camera system is positioned within the environment, there is an act (act 1010) of activating the rotating camera system within the environment to cause the rotating camera system to begin monitoring the environment. Such activation may include turning the rotating camera system on or triggering the system to wake up in some manner.

Then, there is an act (act 1015) of using the activated rotating camera system to detect the specific set of conditions occurring within the environment. The detection may occur by acquiring images and analyzing those images in the manner described earlier (e.g., via machine learning or other analysis techniques). Additionally, the conditions may be the detection of an object, an event, or any other detectable feature within the environment. In response to detecting the specific set of conditions, there is an act (act 1020) of sending an alert (e.g., alert 145 from FIG. 1A). This alert can cause certain remedial actions to then be performed to respond to the detected conditions (e.g., dispatch the police in response to a detected intruder, dispatch a fire engine in response to a fire, trigger a cool down procedure in response to a piece of equipment getting too hot, etc.).

Figure 11:
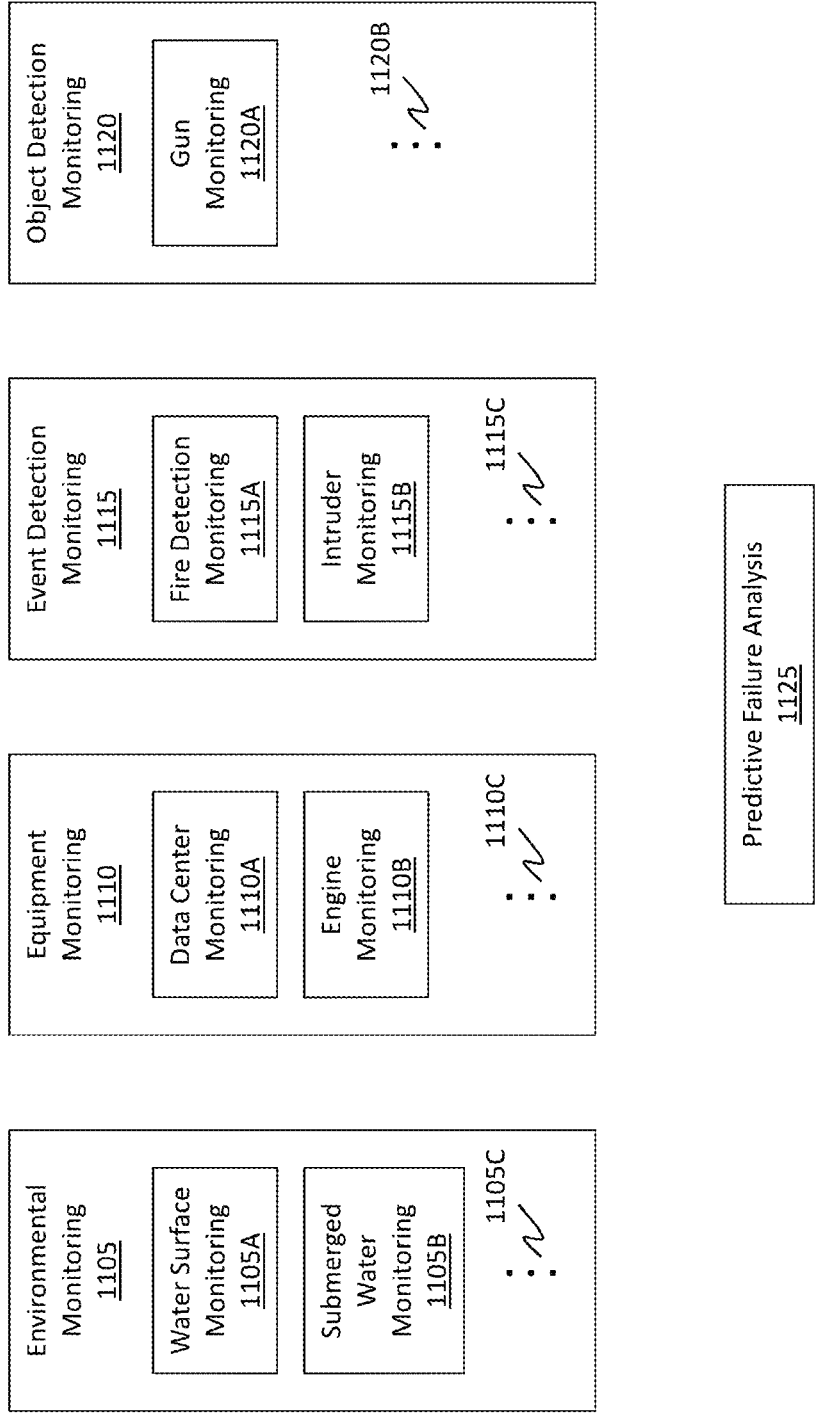
FIG. 11 illustrates some example use-case scenarios in which the disclosed camera system may be used.

Having just introduced how the rotating camera system can be used generally, FIG. 11 shows a number of example use case scenarios 1100 in which the rotating camera system can specifically be used. For instance, the rotating camera system can be used for environment monitoring 1105, equipment monitoring 1110, event detection monitoring 1115, and object detection monitoring 1120. The rotating camera system can also be used to perform predictive failure analysis 1125.

Turning first to the environmental monitoring 1105, FIG. 11 shows how this type of monitoring includes, but is not limited to, water surface monitoring 1105A and submerged water monitoring 1105B. The ellipsis 1105C demonstrates how other environmental conditions can be monitored such as, but not limited to, road conditions, temperature conditions, precipitation conditions, landscape conditions, building conditions, and so on.

Water surface monitoring 1105A includes monitoring the surface of a body of water to detect changes to that surface, such as contaminates, waves, tides, and so forth. Submerged water monitoring 1105B can be performed to detect conditions in water (thereby indicating that the rotating camera system can be waterproof). By way of example, if a computing data center is located underwater (e.g., for cooling purposes), the disclosed embodiments can monitor the water conditions surrounding the data center. The system can also monitor the conditions of the data center itself (e.g., temperature emanating off of the data center).

Equipment monitoring 1110 is shown as being able to perform data center monitoring 1110A (e.g., a cloud computing data center) and even performing engine monitoring 1110B. The ellipsis 1110C demonstrates how any type of equipment may be monitored. For instance, the equipment in a factory or robotics lab can be monitored.

Event detection monitoring 1115 includes the ability to perform fire detection monitoring 1115A and intruder monitoring 1115B. The ellipsis 1115C represents how other types of events may be detected (e.g., via machine learning) and monitored. Examples of other types of events include, but are not limited to, sporting security events, business security events, environment conditions (e.g., rainfall, snowfall, etc.), traffic accident, safety hazard, or any other type of event.

Relatedly, object detection monitoring 1120 may include gun monitoring 1120A or any other type of object detection as included under the ellipsis 1120B. Other examples of object detection include the ability to detect any type of object in a building, home, or outdoor area.

Predictive failure analysis 1125 includes the ability to intelligently predict or estimate when a piece of equipment may fail or undergo a catastrophic event. Such analysis may be based on historical data (e.g., historical data 750 from FIG. 7) that has been collected over a period of time based on camera images acquired over time.

By analyzing the historical data, the embodiments are able to identify behaviors or trends in how a piece of equipment (or some other object) operates. In the future, if the data obtained from currently monitoring the object or equipment indicates that the object or equipment is currently behaving in an abnormal manner (e.g., by deviating some threshold amount or some selected standard deviation away from that object or equipment's behavioral norm, as determined by the historical data), then the camera system can preemptively send an alert to inform a user or other entity regarding a potential failure or catastrophic event.

With that understanding, the remaining figures focus on some specific use-case scenarios. One will appreciate that these scenarios are examples only and that the disclosed embodiments may be used in other scenarios as well.

Figure 12A:
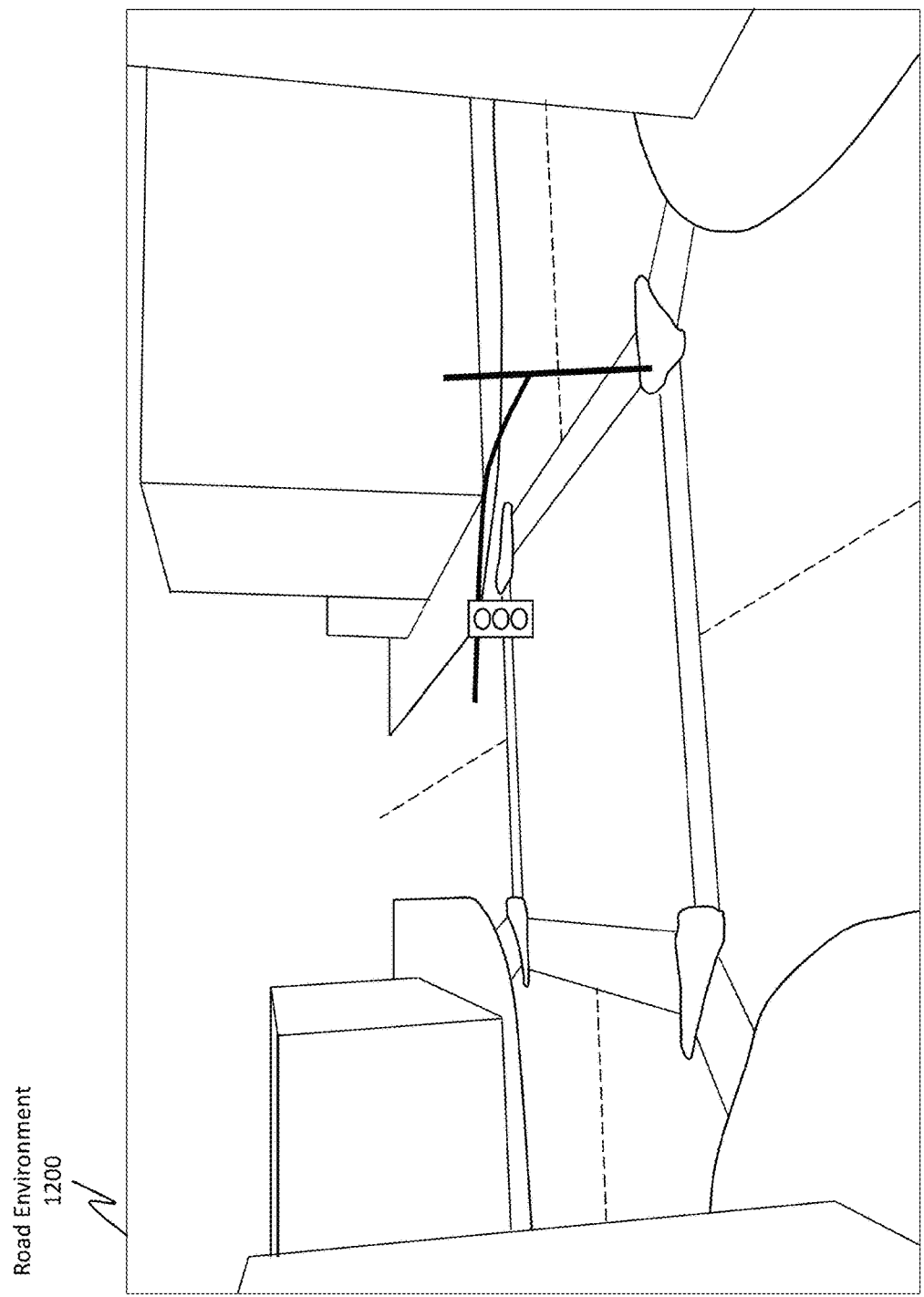
FIGS. 12A and 12B illustrate a specific use-case scenario involving monitoring road conditions.
Figure 12B:
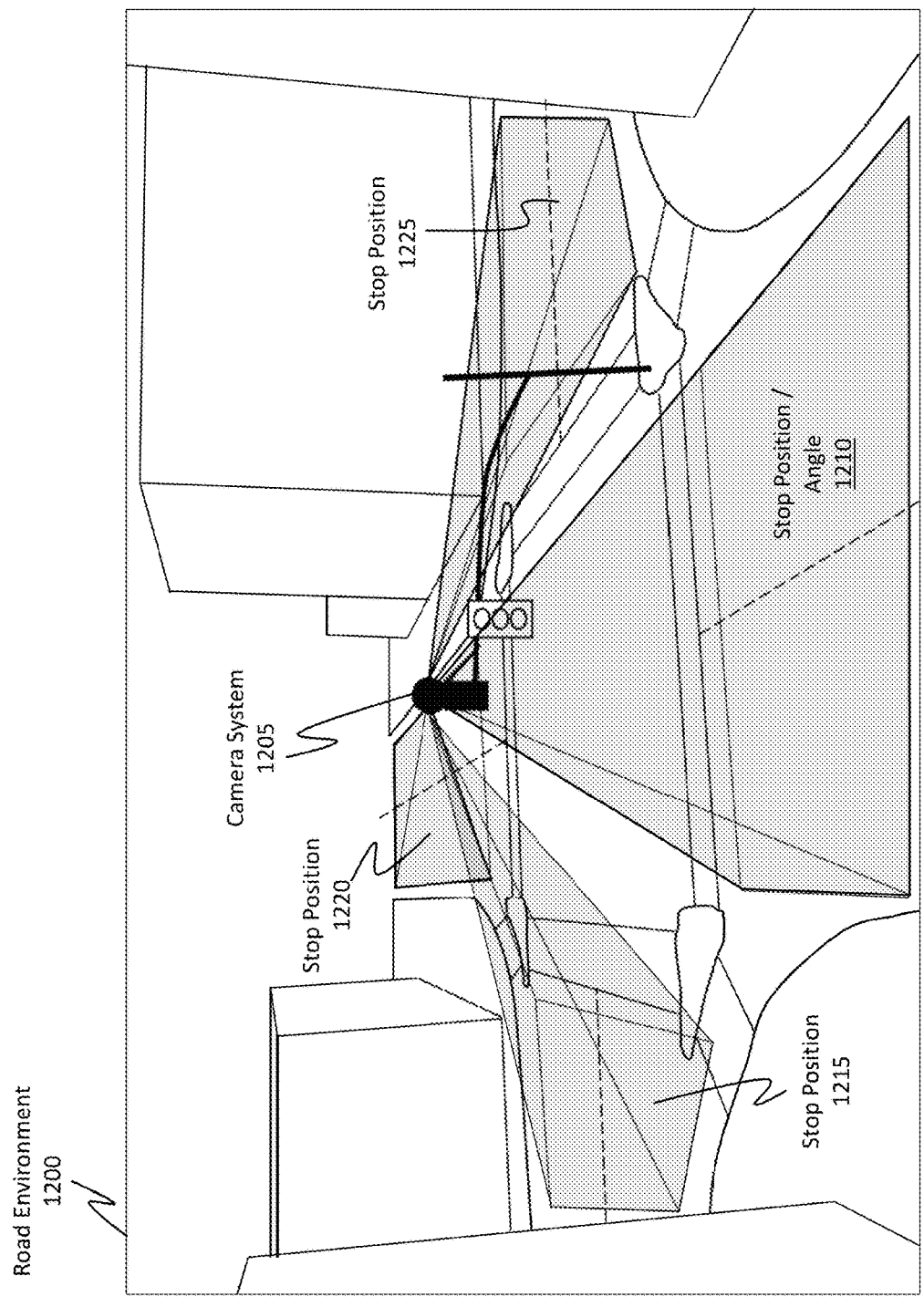

Turning first to FIG. 12A, this figure shows an example of a road environment 1200. In particular, road environment 1200 includes an intersection of roads in a city block. FIG. 12B shows the same road environment 1200 but now with the inclusion of a camera system 1205 configured in the manner described in this disclosure.

Camera system 1205 may include a single uncooled thermal imaging sensor or it may include any number of uncooled thermal imaging sensors. When only a single sensor is used, then the sensor may be rotated in the manner described earlier. When multiple sensors are used, then those sensors may be controlled to point at certain designated locations. The remaining portion of this disclosure will focus on a single uncooled thermal imaging sensor that rotates, but it will be appreciated that the disclosed principles may equally be performed by an array or group of uncooled thermal imaging sensors that may or may not rotate.

In FIG. 12B, the camera system 1205 is being directed to a number of stop or angle positions, including stop position 1210 (also referred to as an "angle" position when multiple sensors are used but that may not rotate), stop position 1215, stop position 1220, and stop position 1225. Each one of these stop positions enables the camera system 1205 to monitor a specific portion of the road environment 1200.

By doing so, the camera system 1205 can monitor traffic conditions, road conditions, environmental conditions, and so forth. If a traffic accident or other event (e.g., concrete crack, inadequate salt conditions on the road during winter, flooding, unsafe precipitation levels, etc.) were to occur, then the camera system 1205 can send an alert to an administrative agency or entity to prompt or trigger that agency or entity to take remedial actions. For instance, if a traffic accident has occurred, then the fire department and the police department may be notified via the alert. Those departments can then perform remedial actions by clearing the road and ensuring public safety.

Figure 13:
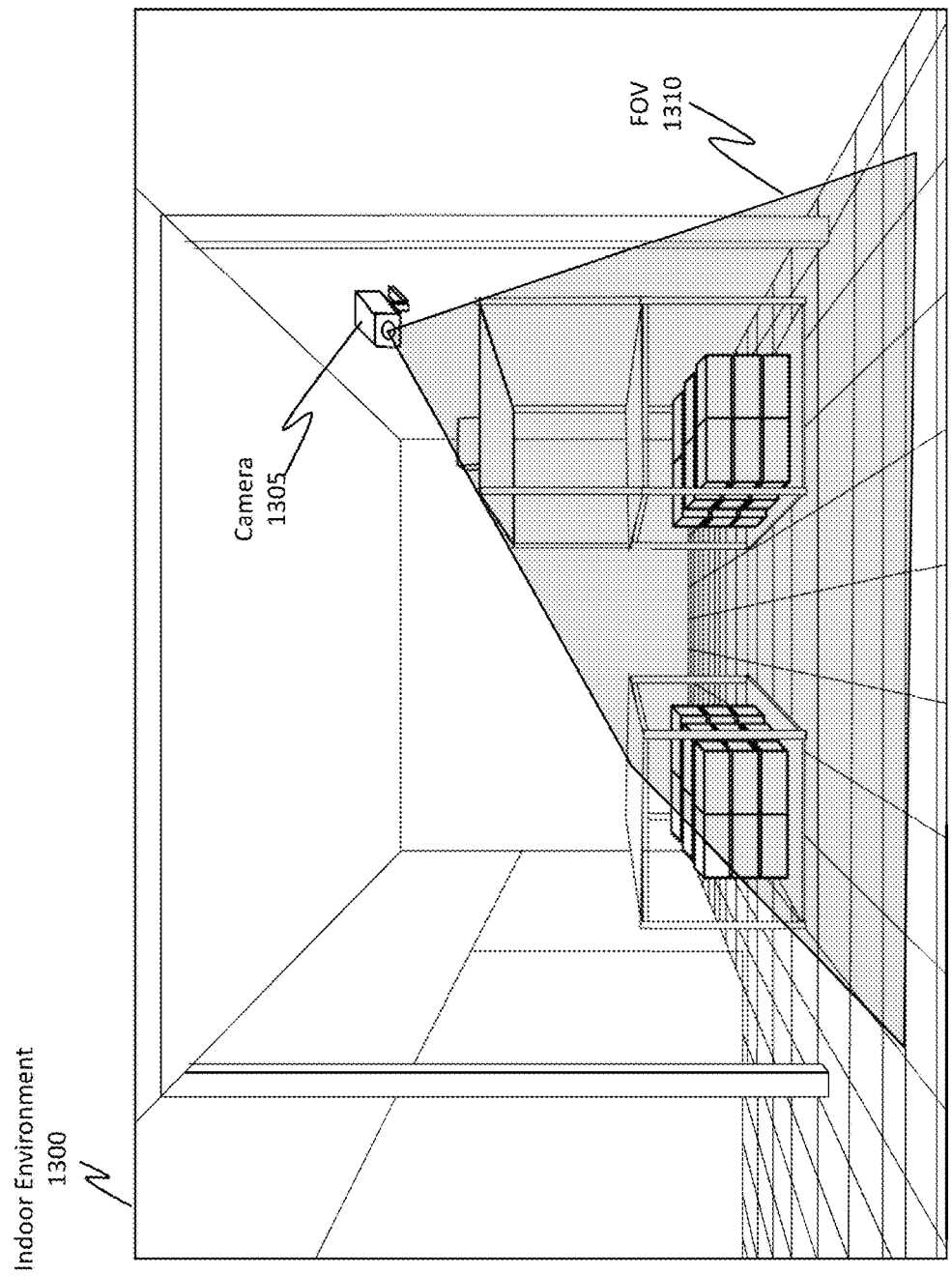
FIG. 13 illustrates a specific use-case scenario involving monitoring an indoor environment, such as a warehouse.

FIG. 13 illustrates an indoor environment 1300 (e.g., perhaps a factory or warehouse) in which a camera 1305 is operating. Camera 1305 may be configured in the same manner as the other cameras discussed thus far. Here, camera 1305 is monitoring any number of specific areas of the indoor environment 1300, as reflected by the FOV 1310. If the camera 1305 were to detect any number of identified events (e.g., intrusion, fire, equipment failure, unsafe box stacking, etc.), then an alert may be raised to notify a manager or some other entity.

Figure 14:
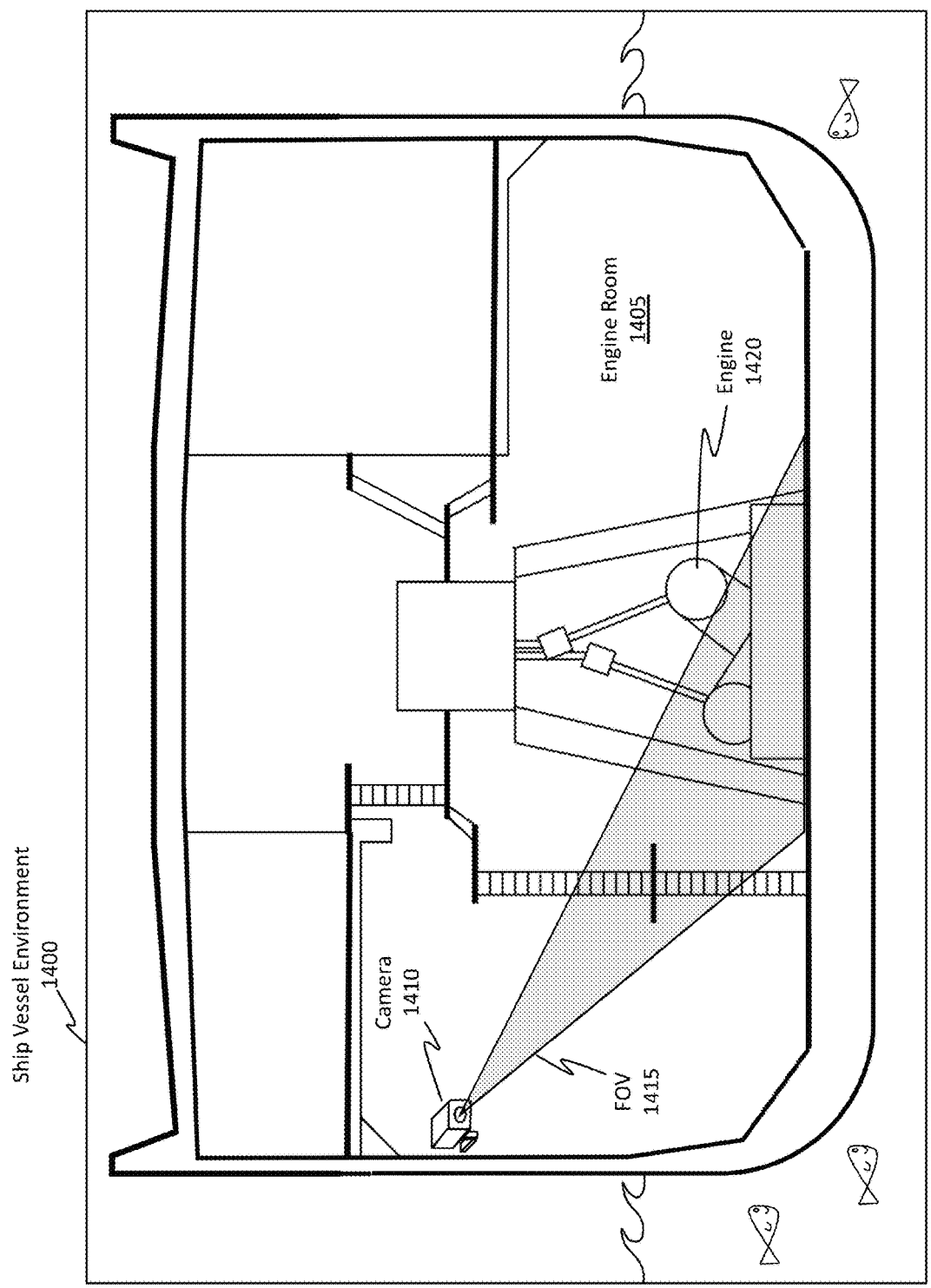
FIG. 14 illustrates a specific use-case scenario involving monitoring certain equipment (e.g., an engine of a waterbound vessel).

FIG. 14 illustrates a ship vessel environment 1400 (e.g., a cruise ship, cargo ship, yacht, aircraft carrier, submarine, or any other water-based vessel). This ship vessel environment 1400 is shown as including an engine room 1405 in which the engine of the ship is operating. Here, a camera 1410 is monitoring the engine room 1405 to ensure proper operation. Specifically, camera 1410 has a FOV 1415 that is directed toward an engine 1420 of the engine room 1405.

Because camera 1410 includes an uncooled thermal imaging sensor, the camera 1410 is able to obtain thermal images of the engine 1420. By comparing current thermal data against historical trends, the embodiments are able to determine whether the engine 1420 is operating under normal or abnormal conditions. That is, the embodiments can perform predictive failure analysis based on the operating conditions of the engine 1420. If the engine 1420's thermal characteristics were to exceed a predetermined thermal threshold, then the embodiments can trigger an alert. In cases were the camera 1410 is coupled to the control room of the ship, then the alert may also cause the engine 1420 to be shut off. Additionally, or alternatively, a sprinkler system may be activated to spray water on the engine 1420 in an attempt to cool it off, or perhaps a climate control system (e.g., blowers) may be activated to cool of the engine 1420.

Of course, camera 1410 can monitor other peripheral equipment as well. Furthermore, depending on the size of the engine room 1405 and the number of stop positions of the camera 1410, the camera 1410 can be configured to monitor any number of conditions. Even further, other types of equipment (e.g., power stations, sub stations, transformers, etc.) can be monitored.

Figure 15:
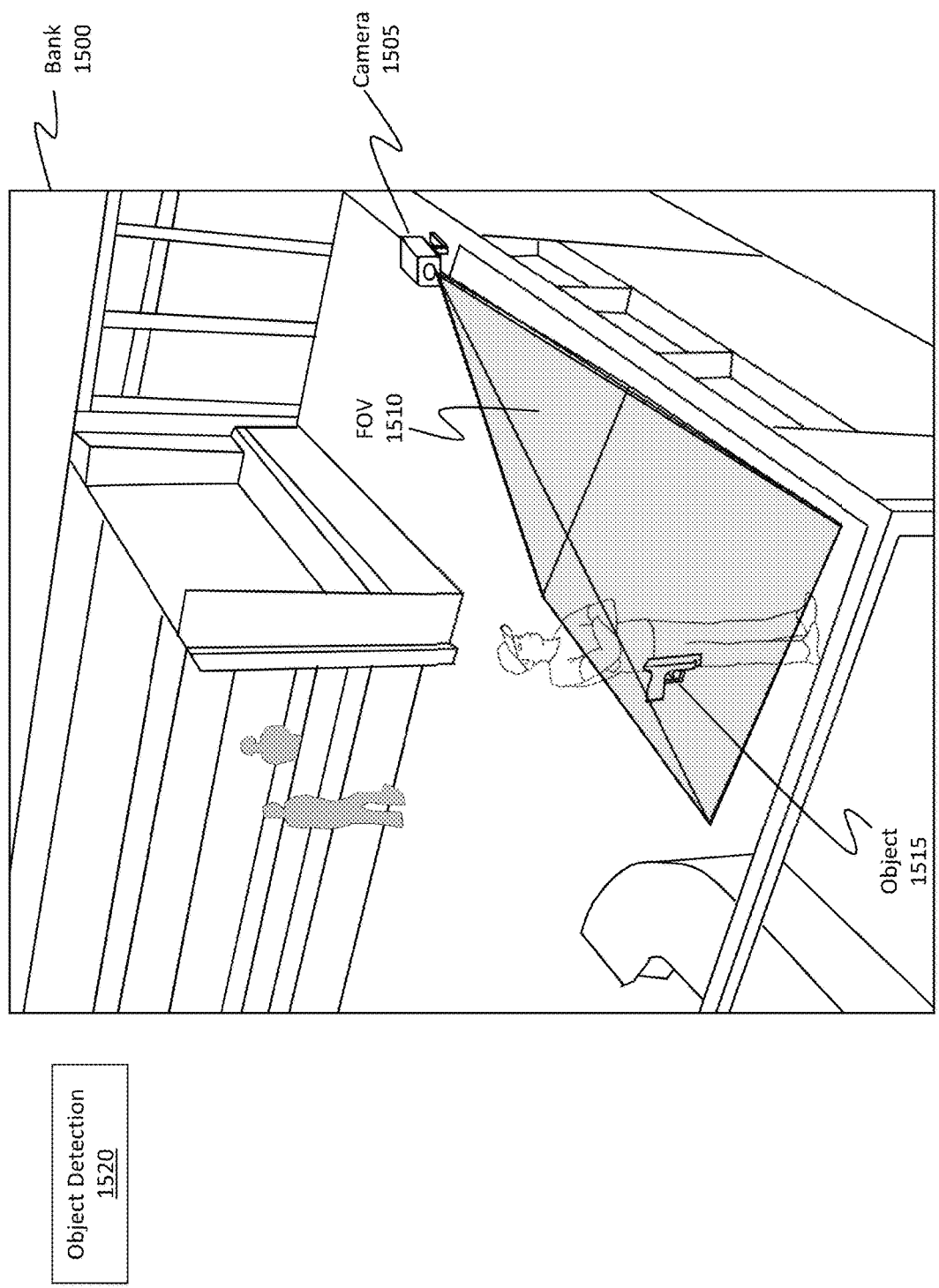
FIG. 15 illustrates how the disclosed embodiments can be used to perform object detection in an environment.

FIG. 15 illustrates a bank 1500, a camera 1505, and a FOV 1510 of the camera 1505. Here, the camera 1505 is monitoring the bank 1500 to detect any number of specific objects, such as object 1515 (i.e. a gun). In this regard, FIG. 15 illustrates an object detection 1520 scenario. Upon detecting an object within a specific category of objects (e.g., a handgun in the firearm category), the embodiments can trigger an alert to the bank 1500 and perform remedial actions. Such actions may include locking the bank or the cash registers, notifying a guard, or even notifying the police.

Figure 16:
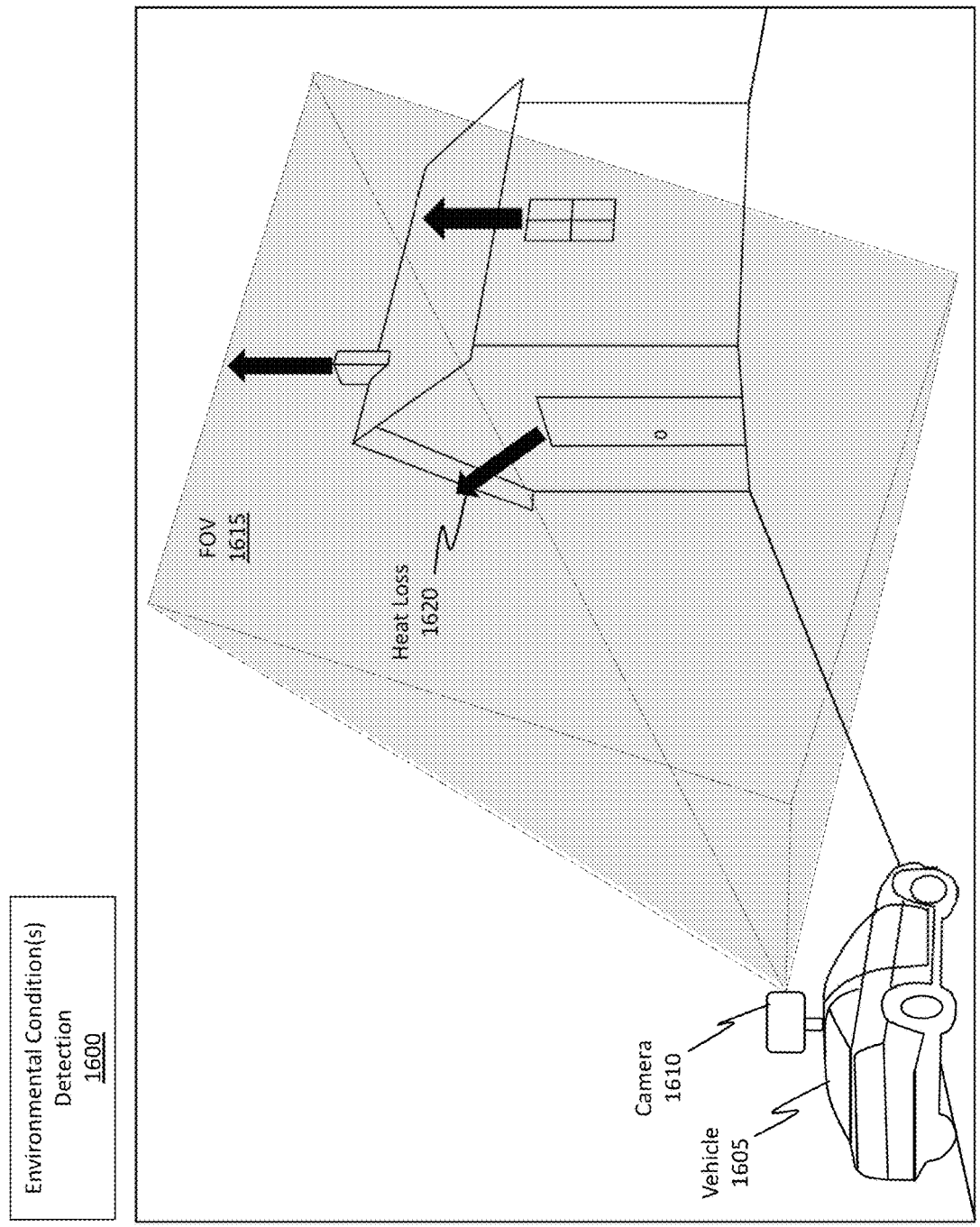
FIG. 16 illustrates a specific use-case scenario involving monitoring heat loss from a structure, such as a building.

FIG. 16 illustrates another scenario of performing environmental condition(s) detection 1600. Specifically, FIG. 16 shows a vehicle 1605 with a camera 1610 having a FOV 1615. The vehicle 1605 can be any type of vehicle, including cars, planes, trains, helicopters, boats, and so forth. The camera 1610 is being used to identify heat leaks in a home or building, as shown by heat loss 1620. By placing the camera 1610 on the vehicle 1605, the camera 1610 can be transported in a secure and easy manner and can be used to detect heat loss 1620 from any number of different buildings. Other characteristics of the buildings (e.g., structural integrity, paint conditions, etc.) can be identified (e.g., via machine learning) as well via use of visible light images and depth images.

Figure 17:
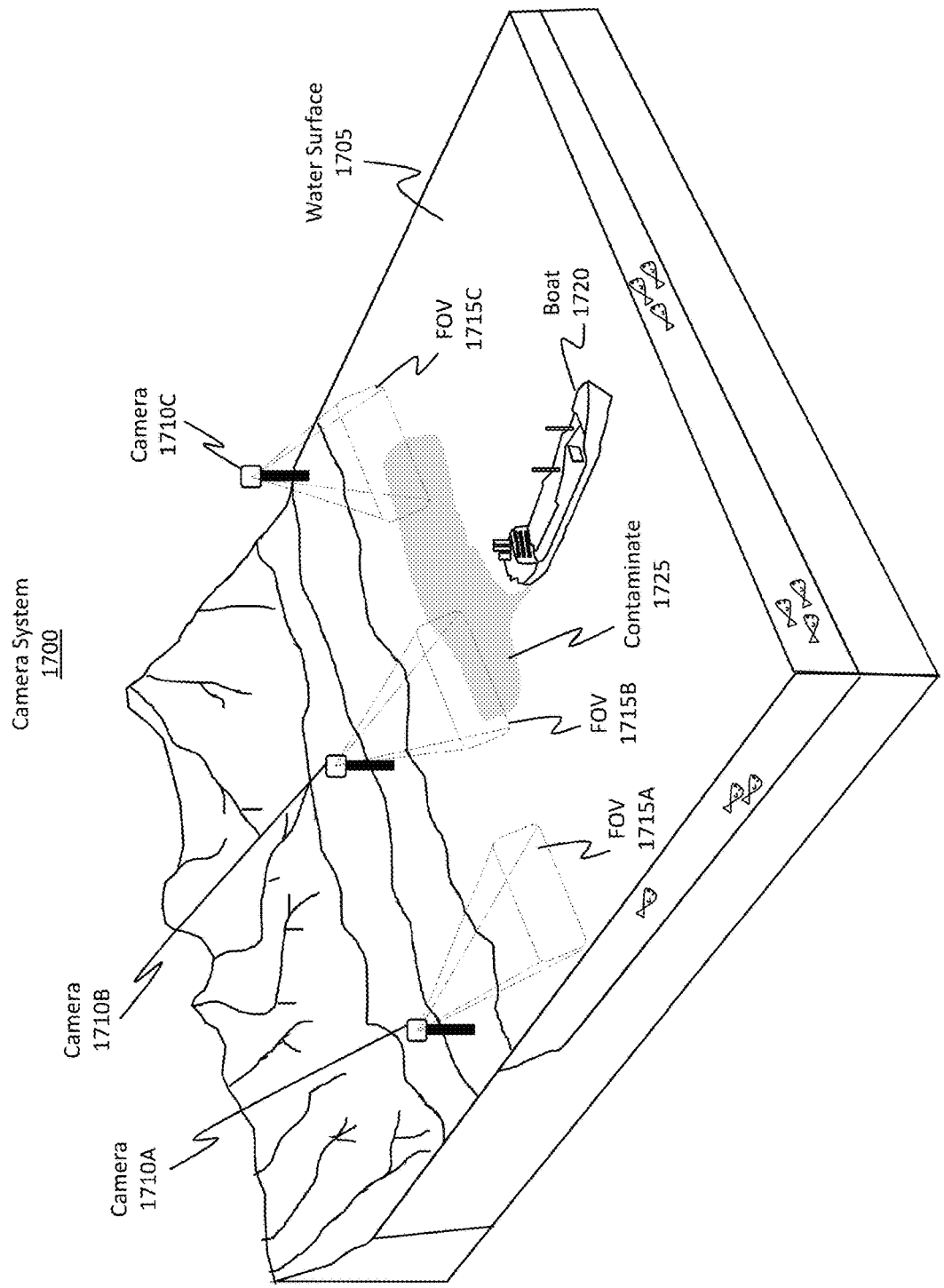
FIG. 17 illustrates a specific use-case scenario involving monitoring the surface of a body of water.

FIG. 17 illustrates a scenario in which multiple cameras are being used to monitor surface water. Specifically, FIG. 17 relates to a camera system 1700 that may be configured or structured in the manner described throughout this disclosure. Camera system 1700 is monitoring water surface 1705, and the system includes cameras 1710A, 1710B, and 1710C. Here, camera 1710A has a FOV 1715A; camera 1710B has a FOV 1715B; and camera 1710C has a FOV 1715C.

In this example scenario, an oil tanker boat 1720 has leaked oil, as shown by contaminate 1725. The cameras 1710A, 1710B, and 1710C are actively monitoring the water surface 1705 and will be able to readily detect the presence of the contaminate 1725. Once the contaminate 1725 is detected, then the camera system 1700 can send an alert to trigger the cleanup of the contaminate 1725.

Accordingly, the disclosed embodiments are directed to an improved type of camera system that includes a rotating uncooled thermal imaging sensor. This camera system can be configured in a specific manner to have a type of motor having a central through-hole through which the camera's coupling connections pass through. Additionally, the system can include an encoder and a slip ring. This improved camera system can be used in numerous different use-cases and can perform numerous different types of operations, some of which may even be performed using machine learning.

Each of Applicant's previous patents and applications are herein incorporated by reference in their entirety, namely U.S. Pat. Nos. 8,773,503; 9,348,196; 9,685,896; 9,390,604; 9,516,208; 9,886,776; 10,127,686; 10,366,509; D776,181; and U.S. Publication No. 2019/0132512.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A rotating camera system configured to rotate about a central axis to temporarily aim an optical axis of a camera sensor of the rotating camera system at directions spanning a 360-degree field of view laterally surrounding a base of the rotating camera system in order to generate one or more image(s) while the camera sensor's optical axis is temporarily aimed at each one of said directions, the rotating camera system comprising:

an uncooled thermal imaging sensor configured to generate one or more thermal image(s) based on a direction of an optical axis of the uncooled thermal imaging sensor;

an electrically powered rotary actuator comprising a rotating shaft that is physically coupled to the uncooled thermal imaging sensor and that enables the uncooled thermal imaging sensor to rotate with the rotating shaft 360 degrees relative to the base of the rotating camera system, wherein the rotating shaft of the electrically powered rotary actuator includes a hollowed central portion through which an electrical connection of the uncooled thermal imaging sensor passes through such that the electrical connection rotates with the uncooled thermal imaging sensor and the rotating shaft of the electrically powered rotary actuator;

a rotary encoder configured to determine an angular position of the rotating shaft as the rotating shaft rotates the 360 degrees relative to the base, the angular position of the rotating shaft also corresponding to an angular position of the uncooled thermal imaging sensor's optical axis; and a slip ring affixed to the rotating shaft, wherein the electrical connection data and power of the uncooled thermal imaging sensor is coupled to a rotating part of the slip ring, and wherein a non-rotating electrical connection is electrically coupled to a non-rotating part of the slip ring, the non-rotating part of the slip ring being electrically coupled to the rotating part of the slip ring such that the electrical connection and the non-rotating electrical connection are continuously electrically coupled to one another as the rotating shaft rotates the 360 degrees relative to the base.

2. The rotating camera system of claim 1, wherein the base of the rotating camera system is orthogonal to the rotating shaft.

3. The rotating camera system of claim 1, wherein the electrically powered rotary actuator includes a 5-phase motor.

4. The rotating camera system of claim 1, wherein an outer portion of the electrically powered rotary actuator remains stationary relative to the rotating shaft and stationary relative to a mount and a body.

5. The rotating camera system of claim 1, wherein the rotating camera system includes one or more of the following: a visible light camera or a depth detection camera.

6. The rotating camera system of claim 1, wherein the rotating camera system additionally includes an external protective housing that fits over a unit comprising the uncooled thermal imaging sensor, the electrically powered rotary actuator, the rotary encoder, and the slip rig.

7. The rotating camera system of claim 6, wherein the external protective housing includes a spike topper or a shade topper.

8. The rotating camera system of claim 1, wherein the uncooled thermal imaging sensor is further configured to rotate vertically relative to the base of the rotating camera system.

9. The rotating camera system of claim 1, wherein the electrically powered rotary actuator is configured to rotate the uncooled thermal imaging sensor 360 degrees relative to the base of the rotating camera system at a rate between 30 revolutions per minute (RPM) and 120 RPM.

10. The rotating camera system of claim 1, wherein the electrically powered rotary actuator is configured to temporarily stop rotating the rotating shaft when the uncooled thermal imaging sensor's optical axis is aimed at each one of a plurality of different stop positions.

11. The rotating camera system of claim 10, wherein, when the rotating shaft is temporarily stopped at any one of the plurality of different stop positions, the uncooled thermal imaging sensor generates between 1 and 100 thermal images, and
  wherein the electrically powered rotary actuator is configured to rotate the uncooled thermal imaging sensor 360 degrees relative to the base of the rotating camera system at a rate between 30 frames per minute (RPM) and 120 RPM.

\* \* \* \* \*